(12) United States Patent
Moskowitz

(10) Patent No.: US 10,735,437 B2
(45) Date of Patent: Aug. 4, 2020

(54) METHODS, SYSTEMS AND DEVICES FOR PACKET WATERMARKING AND EFFICIENT PROVISIONING OF BANDWIDTH

(71) Applicant: Wistaria Trading Ltd, Hamilton (BM)

(72) Inventor: Scott A. Moskowitz, Ft. Lauderdale, FL (US)

(73) Assignee: Wistaria Trading Ltd, Hamilton (BM)

( * ) Notice: Subject to any disclaimer, the term of this patent is extended or adjusted under 35 U.S.C. 154(b) by 328 days.

(21) Appl. No.: 15/456,522

(22) Filed: Mar. 11, 2017

(65) Prior Publication Data

US 2017/0187729 A1   Jun. 29, 2017

Related U.S. Application Data

(60) Division of application No. 13/970,574, filed on Aug. 19, 2013, now Pat. No. 9,639,717, which is a continuation of application No. 13/551,097, filed on Jul. 17, 2012, now Pat. No. 8,706,570, which is a division of application No. 11/900,065, filed on Sep. 10, 2007, now Pat. No. 8,224,705, which is a division of application No. 10/417,231, filed on Apr. 17, 2003, now Pat. No. 7,287,275, said application No. 13/551,097 is a continuation of application No. 13/273,930, filed on Oct. 14, 2011, now Pat. No. 8,473,746, which is a continuation of application No. 12/383,289, filed on Mar. 23, 2009, now Pat. No. 8,104,079, which is a continuation of application No. 11/900,066, filed on Sep. 10, 2007, now Pat. No. 7,530,102, which is a continuation of application No. 10/417,231, filed on Apr. 17, 2003, now Pat. No. 7,287,275.

(60) Provisional application No. 60/372,788, filed on Apr. 17, 2002.

(51) Int. Cl.
| | |
|---|---|
| *H04L 29/06* | (2006.01) |
| *G06Q 30/06* | (2012.01) |
| *H04N 1/32* | (2006.01) |
| *G06F 21/64* | (2013.01) |

(52) U.S. Cl.
CPC ......... *H04L 63/1408* (2013.01); *G06F 21/64* (2013.01); *G06Q 30/0601* (2013.01); *G06Q 30/0641* (2013.01); *H04L 63/0823* (2013.01); *H04L 65/4069* (2013.01); *H04N 1/32128* (2013.01); *H04L 63/0428* (2013.01); *H04N 2201/3205* (2013.01); *H04N 2201/3222* (2013.01); *H04N 2201/3233* (2013.01); *H04N 2201/3246* (2013.01)

(58) Field of Classification Search
CPC . H04L 45/00; H04L 45/12–127; H04L 45/22; H04L 45/30–308; H04L 47/00; H04L 47/50
See application file for complete search history.

(56) References Cited

U.S. PATENT DOCUMENTS

| | | | |
|---|---|---|---|
| 3,947,825 A | 3/1976 | Cassada | |
| 3,984,624 A | 10/1976 | Waggener | |
| 3,986,624 A | 10/1976 | Cates, Jr. et al. | |
| 4,038,596 A | 7/1977 | Lee | |
| 4,200,770 A | 4/1980 | Hellman et al. | |
| 4,218,582 A | 8/1980 | Hellman et al. | |
| 4,339,134 A | 7/1982 | Macheel | |
| 4,390,898 A | 6/1983 | Bond et al. | |
| 4,405,829 A | 9/1983 | Rivest et al. | |
| 4,424,414 A | 1/1984 | Hellman et al. | |
| 4,528,588 A | 7/1985 | Lofberg | |
| 4,529,870 A | 7/1985 | Chaum | |
| 4,633,462 A | 12/1986 | Stifle | |
| 4,672,605 A | 6/1987 | Hustig et al. | |
| 4,748,668 A | 5/1988 | Shamir et al. | |
| 4,749,354 A | 6/1988 | Kerman | |

(Continued)

FOREIGN PATENT DOCUMENTS

| | | |
|---|---|---|
| EP | 0372601 | 6/1990 |
| EP | 0565947 | 10/1993 |

(Continued)

OTHER PUBLICATIONS

U.S. Appl. No. 08/677,435, filed Jul. 2, 1996, Jan. 8, 2016 JRE.
U.S. Appl. No. 09/281,279, filed Mar. 30, 1999, Jan. 8, 2016 JRE.
U.S. Appl. No. 09/789,711, filed Feb. 22, 2001, Jan. 8, 2016 JRE.
U.S. Appl. No. 11/599,838, filed Nov. 15, 2006, Oct. 15, 2010 JRE.
U.S. Appl. No. 11/899,662, filed Sep. 7, 2007, Oct. 15, 2010 JRE.
U.S. Appl. No. 10/369,344, filed Feb. 18, 2003, Aug. 1, 2011 JRE.
U.S. Appl. No. 11/482,654, filed Jul. 7, 2006, Aug. 1, 2011 JRE.
U.S. Appl. No. 12/215,812, filed Jun. 30, 2008, Oct. 15, 2010 JRE.
U.S. Appl. No. 12/901,568, filed Oct. 10, 2010, Nov. 4, 2010 JRE.
U.S. Appl. No. 11/497,822, filed Aug. 2, 2006, Aug. 1, 2011 JRE.
U.S. Appl. No. 12/217,834, filed Jul. 9, 2008, Nov. 8, 2010 JRE.
U.S. Appl. No. 11/897,790, filed Aug. 31, 2007, Aug. 1, 2011 JRE.
U.S. Appl. No. 12/462,799, filed Aug. 10, 2009, Dec. 15, 2010 JRE.
U.S. Appl. No. 11/899,661, filed Sep. 7, 2007, Aug. 1, 2011 JRE.

(Continued)

*Primary Examiner* — Linglan E Edwards
(74) *Attorney, Agent, or Firm* — Neifeld IP Law, PC

(57) ABSTRACT

Disclosed herein are methods and systems for transmitting streams of data. The present invention also relates to generating packet watermarks and packet watermark keys. The present invention also relates to a computerized system for packaging data for transmission to a user. The system may utilize computer code to generate a bandwidth rights certificate that may include: at least one cryptographic credential; routing information for the transmission; and, optionally, a digital signature of a certificate owner; a unique identification code of a certificate owner; a certificate validity period; and pricing information for use of bandwidth. The present invention also relates to an electronic method and system for purchasing good and services by establishing an account whereby a customer is credited with a predetermined amount of bandwidth usage, and then charges are assessed against the account in an amount of bandwidth usage which corresponds to the agreed upon purchase value for the selected item.

26 Claims, No Drawings

(56) References Cited

U.S. PATENT DOCUMENTS

| | | |
|---|---|---|
| 4,789,928 A | 12/1988 | Fujisaki |
| 4,790,564 A | 12/1988 | Larcher |
| 4,827,508 A | 5/1989 | Shear |
| 4,855,584 A | 8/1989 | Tomiyama |
| 4,876,617 A | 10/1989 | Best et al. |
| 4,885,778 A | 12/1989 | Weiss |
| 4,896,275 A | 1/1990 | Jackson |
| 4,908,873 A | 3/1990 | Philibert et al. |
| 4,939,515 A | 7/1990 | Adelson |
| 4,969,204 A | 11/1990 | Melnychuk et al. |
| 4,972,471 A | 11/1990 | Gross et al. |
| 4,977,594 A | 12/1990 | Shear |
| 4,979,210 A | 12/1990 | Nagata et al. |
| 4,980,782 A | 12/1990 | Ginkel |
| 5,050,213 A | 9/1991 | Shear |
| 5,073,925 A | 12/1991 | Nagata et al. |
| 5,077,665 A | 12/1991 | Silverman et al. |
| 5,103,461 A | 3/1992 | Cain |
| 5,109,437 A | 4/1992 | Honda |
| 5,111,530 A | 5/1992 | Kutaragi |
| 5,113,437 A | 5/1992 | Best et al. |
| 5,123,045 A | 6/1992 | Ostrovsky |
| 5,136,581 A | 8/1992 | Muehrcke |
| 5,136,646 A | 8/1992 | Haber et al. |
| 5,136,647 A | 8/1992 | Haber et al. |
| 5,142,576 A | 8/1992 | Nadan |
| 5,161,210 A | 11/1992 | Druyvesteyn et al. |
| 5,164,992 A | 11/1992 | Turk |
| 5,189,411 A | 2/1993 | Collar |
| 5,210,820 A | 5/1993 | Kenyon |
| 5,243,423 A | 9/1993 | DeJean et al. |
| 5,243,515 A | 9/1993 | Lee |
| 5,280,527 A | 1/1994 | Gullman |
| 5,287,407 A | 2/1994 | Holmes |
| 5,291,560 A | 3/1994 | Daugman |
| 5,293,633 A | 3/1994 | Robbins |
| 5,297,032 A | 3/1994 | Trojan |
| 5,319,735 A | 6/1994 | Preuss et al. |
| 5,327,520 A | 7/1994 | Chen |
| 5,341,429 A | 8/1994 | Stringer et al. |
| 5,341,477 A | 8/1994 | Pitkin et al. |
| 5,363,448 A | 11/1994 | Koopman et al. |
| 5,365,586 A | 11/1994 | Indeck et al. |
| 5,369,707 A | 11/1994 | Follendore, III |
| 5,375,055 A | 12/1994 | Togher |
| 5,379,345 A | 1/1995 | Greenberg |
| 5,394,324 A | 2/1995 | Clearwater |
| 5,398,285 A | 3/1995 | Borgelt et al. |
| 5,406,627 A | 4/1995 | Thompson et al. |
| 5,408,505 A | 4/1995 | Indeck et al. |
| 5,410,598 A | 4/1995 | Shear |
| 5,412,718 A | 5/1995 | Narasimhalv et al. |
| 5,418,713 A | 5/1995 | Allen |
| 5,428,606 A | 6/1995 | Moskowitz |
| 5,437,050 A | 7/1995 | Lamb |
| 5,450,490 A | 9/1995 | Jensen et al. |
| 5,463,641 A | 10/1995 | Dorward |
| 5,469,536 A | 11/1995 | Blank |
| 5,471,533 A | 11/1995 | Wang et al. |
| 5,478,990 A | 12/1995 | Montanari et al. |
| 5,479,210 A | 12/1995 | Cawley et al. |
| 5,487,168 A | 1/1996 | Geiner et al. |
| 5,493,677 A | 2/1996 | Balogh et al. |
| 5,497,419 A | 3/1996 | Hill |
| 5,506,795 A | 4/1996 | Yamakawa |
| 5,513,126 A | 4/1996 | Harkins et al. |
| 5,513,261 A | 4/1996 | Maher |
| 5,530,739 A | 6/1996 | Okada |
| 5,530,751 A | 6/1996 | Morris |
| 5,530,759 A | 6/1996 | Braudaway et al. |
| 5,539,735 A | 7/1996 | Moskowitz |
| 5,548,579 A | 8/1996 | Lebrun et al. |
| 5,568,570 A | 10/1996 | Rabbani |
| 5,570,339 A | 10/1996 | Nagano |
| 5,579,124 A | 11/1996 | Aijala et al. |
| 5,581,703 A | 12/1996 | Baugher et al. |
| 5,583,488 A | 12/1996 | Sala et al. |
| 5,598,470 A | 1/1997 | Cooper et al. |
| 5,606,609 A | 2/1997 | Houser et al. |
| 5,613,004 A | 3/1997 | Cooperman et al. |
| 5,617,119 A | 4/1997 | Briggs et al. |
| 5,617,506 A | 4/1997 | Burk |
| 5,625,690 A | 4/1997 | Michel et al. |
| 5,629,980 A | 5/1997 | Stefik et al. |
| 5,633,932 A | 5/1997 | Davis et al. |
| 5,634,040 A | 5/1997 | Her et al. |
| 5,636,276 A | 6/1997 | Brugger |
| 5,636,292 A | 6/1997 | Rhoads |
| 5,640,569 A | 6/1997 | Miller et al. |
| 5,644,727 A | 7/1997 | Atkins |
| 5,646,997 A | 7/1997 | Barton |
| 5,649,284 A | 7/1997 | Yoshinobu |
| 5,657,461 A | 8/1997 | Harkins et al. |
| 5,659,726 A | 8/1997 | Sandford, II et al. |
| 5,664,018 A | 9/1997 | Leighton |
| 5,673,316 A | 9/1997 | Auerbach et al. |
| 5,675,653 A | 10/1997 | Nelson |
| 5,677,952 A | 10/1997 | Blakely et al. |
| 5,680,462 A | 10/1997 | Miller et al. |
| 5,687,236 A | 11/1997 | Moskowitz et al. |
| 5,689,587 A | 11/1997 | Bender et al. |
| 5,696,828 A | 12/1997 | Koopman, Jr. |
| 5,719,937 A | 2/1998 | Warren et al. |
| 5,721,781 A | 2/1998 | Deo |
| 5,721,788 A | 2/1998 | Powell et al. |
| 5,734,752 A | 3/1998 | Knox |
| 5,737,416 A | 4/1998 | Cooper et al. |
| 5,737,733 A | 4/1998 | Eller |
| 5,740,244 A | 4/1998 | Indeck et al. |
| 5,745,569 A | 4/1998 | Moskowitz et al. |
| 5,745,604 A | 4/1998 | Rhoads |
| 5,748,783 A | 5/1998 | Rhoads |
| 5,751,811 A | 5/1998 | Magnotti et al. |
| 5,754,697 A | 5/1998 | Fu et al. |
| 5,754,938 A | 5/1998 | Herz |
| 5,757,923 A | 5/1998 | Koopman, Jr. |
| 5,765,152 A | 6/1998 | Erickson |
| 5,768,396 A | 6/1998 | Sone |
| 5,774,452 A | 6/1998 | Wolosewicz |
| 5,781,184 A | 7/1998 | Wasserman |
| 5,790,677 A | 8/1998 | Fox et al. |
| 5,790,783 A | 8/1998 | Lee |
| 5,799,083 A | 8/1998 | Brothers et al. |
| 5,809,139 A | 9/1998 | Grirod et al. |
| 5,809,160 A | 9/1998 | Powell et al. |
| 5,818,818 A | 10/1998 | Soumiya |
| 5,822,432 A * | 10/1998 | Moskowitz ........... G06T 1/0028 380/28 |
| 5,822,436 A | 10/1998 | Rhoads |
| 5,825,976 A | 10/1998 | Dorward |
| 5,828,325 A | 10/1998 | Wolosewicz et al. |
| 5,832,119 A | 11/1998 | Rhoads |
| 5,839,100 A | 11/1998 | Wegener |
| 5,842,213 A | 11/1998 | Odom |
| 5,845,266 A | 12/1998 | Lupien |
| 5,848,155 A | 12/1998 | Cox |
| 5,850,449 A * | 12/1998 | McManis ................ H04L 29/06 713/161 |
| 5,850,481 A | 12/1998 | Rhoads |
| 5,859,920 A | 1/1999 | Daly et al. |
| 5,860,099 A | 1/1999 | Milios et al. |
| 5,862,260 A | 1/1999 | Rhoads |
| 5,864,827 A | 1/1999 | Wilson |
| 5,870,474 A | 2/1999 | Wasilewski et al. |
| 5,870,723 A | 2/1999 | Pare |
| 5,875,437 A | 2/1999 | Atkins |
| 5,884,033 A | 3/1999 | Duvall et al. |
| 5,889,868 A | 3/1999 | Moskowitz et al. |
| 5,892,900 A | 4/1999 | Ginter |
| 5,893,067 A | 4/1999 | Bender et al. |
| 5,894,521 A | 4/1999 | Conley |
| 5,901,178 A | 5/1999 | Lee |
| 5,903,721 A | 5/1999 | Sixtus |
| 5,905,800 A | 5/1999 | Moskowitz et al. |

(56) References Cited

U.S. PATENT DOCUMENTS

| | | |
|---|---|---|
| 5,905,975 A | 5/1999 | Ausubel |
| 5,912,972 A | 6/1999 | Barton |
| 5,915,027 A | 6/1999 | Cox et al. |
| 5,917,915 A | 6/1999 | Hirose |
| 5,918,223 A | 6/1999 | Blum |
| 5,920,900 A | 7/1999 | Poole et al. |
| 5,923,763 A | 7/1999 | Walker et al. |
| 5,930,369 A | 7/1999 | Cox et al. |
| 5,930,377 A | 7/1999 | Powell et al. |
| 5,930,767 A | 7/1999 | Reber |
| 5,933,497 A | 8/1999 | Beetcher |
| 5,935,243 A | 8/1999 | Hasebe |
| 5,940,134 A | 8/1999 | Wirtz |
| 5,943,422 A | 8/1999 | Van Wie et al. |
| 5,949,055 A | 9/1999 | Fleet |
| 5,949,973 A | 9/1999 | Yarom |
| 5,963,909 A | 10/1999 | Warren et al. |
| 5,973,731 A | 10/1999 | Schwab |
| 5,974,141 A | 10/1999 | Saito |
| 5,982,892 A | 11/1999 | Hicks |
| 5,991,426 A | 11/1999 | Cox et al. |
| 5,991,431 A | 11/1999 | Borza |
| 5,995,630 A | 11/1999 | Borza |
| 5,999,217 A | 12/1999 | Berners-Lee |
| 6,000,832 A | 12/1999 | Franklin |
| 6,009,176 A | 12/1999 | Gennaro et al. |
| 6,018,722 A | 1/2000 | Ray |
| 6,029,126 A | 2/2000 | Malvar |
| 6,029,146 A | 2/2000 | Hawkins |
| 6,029,195 A | 2/2000 | Herz |
| 6,032,957 A | 3/2000 | Kiyosaki |
| 6,035,398 A | 3/2000 | Bjorn |
| 6,041,316 A | 3/2000 | Allen |
| 6,044,471 A | 3/2000 | Colvin |
| 6,049,838 A | 4/2000 | Miller et al. |
| 6,051,029 A | 4/2000 | Paterson et al. |
| 6,061,793 A | 5/2000 | Tewfik et al. |
| 6,067,622 A | 5/2000 | Moore |
| 6,069,914 A | 5/2000 | Cox |
| 6,078,664 A | 6/2000 | Moskowitz et al. |
| 6,081,251 A | 6/2000 | Sakai et al. |
| 6,081,587 A | 6/2000 | Reyes et al. |
| 6,081,597 A | 6/2000 | Hoffstein |
| 6,088,455 A | 7/2000 | Logan et al. |
| 6,108,722 A | 8/2000 | Troeller |
| 6,111,517 A | 8/2000 | Atick |
| 6,122,403 A | 9/2000 | Rhoads |
| 6,128,626 A | 10/2000 | Beauchesne |
| 6,128,735 A | 10/2000 | Goldstein |
| 6,131,162 A | 10/2000 | Yoshiura et al. |
| 6,134,535 A | 10/2000 | Belzberg |
| 6,138,239 A | 10/2000 | Veil |
| 6,141,753 A | 10/2000 | Zhao et al. |
| 6,141,754 A | 10/2000 | Choy |
| 6,148,333 A | 11/2000 | Guedalia |
| 6,154,172 A | 11/2000 | Piccionelli |
| 6,154,571 A | 11/2000 | Cox et al. |
| 6,173,322 B1 | 1/2001 | Hu |
| 6,178,405 B1 | 1/2001 | Ouyang |
| 6,185,683 B1 | 2/2001 | Ginter |
| 6,192,138 B1 | 2/2001 | Yamadaji |
| 6,199,058 B1 | 3/2001 | Wong et al. |
| 6,205,249 B1 | 3/2001 | Moskowitz |
| 6,208,745 B1 | 3/2001 | Florenio et al. |
| 6,226,618 B1 | 5/2001 | Downs |
| 6,230,268 B1 | 5/2001 | Miwa et al. |
| 6,233,347 B1 | 5/2001 | Chen et al. |
| 6,233,566 B1 | 5/2001 | Levine |
| 6,233,684 B1 | 5/2001 | Stefik et al. |
| 6,233,736 B1 | 5/2001 | Wolzien |
| 6,236,971 B1 | 5/2001 | Stefik |
| 6,240,121 B1 | 5/2001 | Senoh |
| 6,243,667 B1 * | 6/2001 | Kerr ............... H04L 45/00 370/379 |
| 6,253,193 B1 | 6/2001 | Ginter |
| 6,263,313 B1 | 7/2001 | Milstead et al. |
| 6,266,419 B1 | 7/2001 | Lacy |
| 6,272,474 B1 | 8/2001 | Garcia |
| 6,272,535 B1 | 8/2001 | Iwamura |
| 6,272,634 B1 | 8/2001 | Tewfik et al. |
| 6,275,988 B1 | 8/2001 | Nagashima et al. |
| 6,278,780 B1 | 8/2001 | Shimada |
| 6,278,791 B1 | 8/2001 | Honsinger et al. |
| 6,282,300 B1 | 8/2001 | Bloom et al. |
| 6,282,650 B1 | 8/2001 | Davis |
| 6,285,775 B1 | 9/2001 | Wu et al. |
| 6,301,663 B1 | 10/2001 | Kato et al. |
| 6,310,962 B1 | 10/2001 | Chung et al. |
| 6,317,728 B1 | 11/2001 | Kane |
| 6,324,649 B1 | 11/2001 | Eyres |
| 6,330,335 B1 | 12/2001 | Rhoads |
| 6,330,672 B1 | 12/2001 | Shur |
| 6,341,165 B1 | 1/2002 | Gbur |
| 6,345,100 B1 | 2/2002 | Levine |
| 6,345,389 B1 | 2/2002 | Dureau |
| 6,351,765 B1 | 2/2002 | Pietropaolo et al. |
| 6,363,483 B1 | 3/2002 | Keshav |
| 6,363,488 B1 | 3/2002 | Ginter |
| 6,373,892 B1 | 4/2002 | Ichien et al. |
| 6,373,960 B1 | 4/2002 | Conover et al. |
| 6,374,036 B1 | 4/2002 | Ryan et al. |
| 6,377,625 B1 | 4/2002 | Kim |
| 6,381,618 B1 | 4/2002 | Jones et al. |
| 6,381,747 B1 | 4/2002 | Wonfor et al. |
| 6,385,324 B1 | 5/2002 | Koppen |
| 6,385,329 B1 | 5/2002 | Sharma et al. |
| 6,385,596 B1 | 5/2002 | Wiser |
| 6,389,402 B1 | 5/2002 | Ginter |
| 6,389,403 B1 | 5/2002 | Dorak |
| 6,389,538 B1 | 5/2002 | Gruse et al. |
| 6,398,245 B1 | 6/2002 | Gruse |
| 6,405,203 B1 | 6/2002 | Conan |
| 6,418,421 B1 | 6/2002 | Hurtado |
| 6,415,041 B1 | 7/2002 | Oami et al. |
| 6,425,081 B1 | 7/2002 | Iwamura |
| 6,427,140 B1 | 7/2002 | Ginter |
| 6,430,301 B1 | 8/2002 | Petrovic |
| 6,430,302 B2 | 8/2002 | Rhoads |
| 6,434,238 B1 | 8/2002 | Chaum |
| 6,442,283 B1 | 8/2002 | Tewfik et al. |
| 6,446,211 B1 | 9/2002 | Colvin |
| 6,453,252 B1 | 9/2002 | Laroche |
| 6,453,301 B1 | 9/2002 | Niwa |
| 6,457,058 B1 | 9/2002 | Ullum et al. |
| 6,463,468 B1 | 10/2002 | Buch et al. |
| 6,469,239 B1 | 10/2002 | Fukuda |
| 6,480,963 B1 | 10/2002 | Tachibana |
| 6,480,937 B1 | 11/2002 | Vorbach |
| 6,484,153 B1 | 11/2002 | Walker |
| 6,484,264 B1 | 11/2002 | Colvin |
| 6,493,457 B1 | 12/2002 | Quackenbush |
| 6,502,195 B1 | 12/2002 | Colvin |
| 6,510,513 B1 | 1/2003 | Darrow |
| 6,513,118 B1 | 1/2003 | Iwamura |
| 6,522,767 B1 | 2/2003 | Moskowitz et al. |
| 6,522,769 B1 | 2/2003 | Rhoads et al. |
| 6,523,113 B1 | 2/2003 | Wehrenberg |
| 6,530,021 B1 | 3/2003 | Epstein et al. |
| 6,532,284 B2 | 3/2003 | Walker et al. |
| 6,532,298 B1 | 3/2003 | Cambier |
| 6,539,475 B1 | 3/2003 | Cox et al. |
| 6,552,127 B1 | 4/2003 | Kurowski |
| 6,553,127 B1 | 4/2003 | Kurowski |
| 6,556,976 B1 | 4/2003 | Callen |
| 6,557,103 B1 | 4/2003 | Boncelet, Jr. et al. |
| 6,574,608 B1 | 6/2003 | Dahod |
| 6,584,125 B1 | 6/2003 | Katto |
| 6,590,996 B1 | 6/2003 | Reed |
| 6,587,837 B1 | 7/2003 | Spagna et al. |
| 6,594,643 B1 | 7/2003 | Freeny |
| 6,598,162 B1 | 7/2003 | Moskowitz |
| 6,601,044 B1 | 7/2003 | Wallman |
| 6,606,393 B1 | 8/2003 | Xie et al. |
| 6,611,599 B2 | 8/2003 | Natarajan |

(56) References Cited

U.S. PATENT DOCUMENTS

| | | | |
|---|---|---|---|
| 6,615,188 B1 | 9/2003 | Breen | |
| 6,618,188 B2 | 9/2003 | Haga | |
| 6,647,424 B1 * | 11/2003 | Pearson | H04L 29/06 370/235 |
| 6,650,761 B1 | 11/2003 | Rodriguez | |
| 6,658,010 B1 | 12/2003 | Enns et al. | |
| 6,665,489 B2 | 12/2003 | Collart | |
| 6,668,246 B1 | 12/2003 | Yeung et al. | |
| 6,668,325 B1 | 12/2003 | Collberg et al. | |
| 6,674,858 B1 | 1/2004 | Kimura | |
| 6,674,877 B1 | 1/2004 | Jojic | |
| 6,678,465 B1 | 1/2004 | Swan | |
| 6,683,865 B1 * | 1/2004 | Garcia-Luna-Aceves | H04L 45/00 370/349 |
| 6,687,375 B1 | 2/2004 | Matyas | |
| 6,687,683 B1 | 2/2004 | Harada et al. | |
| 6,704,451 B1 | 3/2004 | Hekstra | |
| 6,711,152 B1 * | 3/2004 | Kalmanek, Jr. | H04L 45/04 370/351 |
| 6,718,507 B1 | 4/2004 | Johnston | |
| 6,725,372 B1 | 4/2004 | Lewis et al. | |
| 6,704,576 B1 | 5/2004 | Brachman | |
| 6,735,702 B1 | 5/2004 | Yavatkar | |
| 6,751,728 B1 * | 6/2004 | Gunter | H04L 29/12009 709/245 |
| 6,754,822 B1 | 6/2004 | Zhao | |
| 6,760,443 B2 | 7/2004 | Lacy | |
| 6,775,772 B1 | 8/2004 | Binding et al. | |
| 6,778,968 B1 | 8/2004 | Gulati | |
| 6,784,354 B1 | 8/2004 | Lu et al. | |
| 6,785,815 B1 | 8/2004 | Serret-Avila et al. | |
| 6,785,825 B2 | 8/2004 | Colvin | |
| 6,792,424 B1 | 9/2004 | Burns | |
| 6,792,548 B2 | 9/2004 | Colvin | |
| 6,792,549 B2 | 9/2004 | Colvin | |
| 6,795,925 B2 | 9/2004 | Colvin | |
| 6,799,277 B2 | 9/2004 | Colvin | |
| 6,804,453 B1 | 10/2004 | Sasamoto | |
| 6,813,717 B2 | 11/2004 | Colvin | |
| 6,813,718 B2 | 11/2004 | Colvin | |
| 6,820,204 B1 | 11/2004 | Desai | |
| 6,823,455 B1 | 11/2004 | Macy et al. | |
| 6,826,195 B1 * | 11/2004 | Nikolich | H04Q 11/0478 370/400 |
| 6,834,308 B1 | 12/2004 | Ikezoye et al. | |
| 6,839,686 B1 | 1/2005 | Galant | |
| 6,842,862 B2 | 1/2005 | Chow et al. | |
| 6,856,967 B1 | 1/2005 | Woolston | |
| 6,850,559 B1 | 2/2005 | Driessen | |
| 6,853,726 B1 | 2/2005 | Moskowitz et al. | |
| 6,856,867 B2 | 2/2005 | Woolston | |
| 6,857,078 B2 | 2/2005 | Colvin | |
| 6,865,747 B1 | 3/2005 | Mercier | |
| 6,876,982 B1 | 4/2005 | Lancaster | |
| 6,885,749 B1 | 4/2005 | Chang | |
| 6,898,706 B1 | 5/2005 | Venkatesan | |
| 6,931,534 B1 | 8/2005 | Jandel et al. | |
| 6,950,941 B1 | 9/2005 | Lee | |
| 6,952,774 B1 | 10/2005 | Kirovski | |
| 6,957,330 B1 | 10/2005 | Hughes | |
| 6,959,288 B1 | 10/2005 | Medina | |
| 6,966,002 B1 | 11/2005 | Torrubia-Saez | |
| 6,977,894 B1 | 12/2005 | Achilles et al. | |
| 6,978,370 B1 | 12/2005 | Kocher | |
| 6,983,058 B1 | 1/2006 | Fukuoka | |
| 6,983,337 B2 | 1/2006 | Diamant | |
| 6,986,063 B2 | 1/2006 | Colvin | |
| 6,990,453 B2 | 1/2006 | Wang | |
| 7,003,480 B2 | 2/2006 | Fox | |
| 7,007,166 B1 | 2/2006 | Moskowitz et al. | |
| 7,020,285 B1 | 3/2006 | Kirovski et al. | |
| 7,020,888 B2 | 3/2006 | Reynolds | |
| 7,028,327 B1 | 4/2006 | Dougherty | |
| 7,035,049 B2 | 4/2006 | Yamamoto | |
| 7,035,409 B1 | 4/2006 | Moskowitz | |
| 7,042,933 B2 | 5/2006 | Driessen | |
| 7,043,050 B2 | 5/2006 | Yuval | |
| 7,046,808 B1 | 5/2006 | Metois et al. | |
| 7,050,396 B1 | 5/2006 | Cohen et al. | |
| 7,051,208 B2 | 5/2006 | Venkatesan et al. | |
| 7,055,169 B2 | 5/2006 | Delpuch | |
| 7,058,570 B1 | 6/2006 | Yu et al. | |
| 7,076,426 B1 | 7/2006 | Buetnagel | |
| 7,093,295 B1 | 8/2006 | Saito | |
| 7,095,715 B2 | 8/2006 | Buckman | |
| 7,095,874 B2 | 8/2006 | Moskowitz et al. | |
| 7,103,184 B2 | 9/2006 | Jian | |
| 7,103,574 B1 | 9/2006 | Peinado | |
| 7,107,451 B2 | 9/2006 | Moskowitz | |
| 7,123,718 B1 | 10/2006 | Moskowitz et al. | |
| 7,124,173 B2 * | 10/2006 | Moriarty | H04L 63/0236 709/219 |
| 7,127,615 B2 | 10/2006 | Moskowitz | |
| 7,131,007 B1 | 10/2006 | Johnston | |
| 7,146,503 B1 | 12/2006 | Johnston | |
| 7,150,003 B2 | 12/2006 | Naumovich et al. | |
| 7,151,775 B1 * | 12/2006 | Renwick | H04L 45/00 370/400 |
| 7,152,162 B2 | 12/2006 | Moskowitz et al. | |
| 7,159,116 B2 | 1/2007 | Moskowitz | |
| 7,162,642 B2 | 1/2007 | Schumann et al. | |
| 7,177,429 B2 | 2/2007 | Moskowitz et al. | |
| 7,177,430 B2 | 2/2007 | Kim | |
| 7,206,649 B2 | 4/2007 | Kirovski et al. | |
| 7,225,467 B2 * | 5/2007 | Dapp | H04L 63/1416 709/225 |
| 7,231,524 B2 | 6/2007 | Burns | |
| 7,233,669 B2 | 6/2007 | Candelore | |
| 7,233,948 B1 | 6/2007 | Shamoon | |
| 7,240,210 B2 | 7/2007 | Michak et al. | |
| 7,251,825 B2 | 7/2007 | Collet | |
| 7,254,538 B1 | 8/2007 | Ellis | |
| 7,263,497 B1 | 8/2007 | Wiser | |
| 7,266,697 B2 | 9/2007 | Kirovski et al. | |
| 7,286,451 B2 | 10/2007 | Wirtz | |
| 7,287,275 B2 | 10/2007 | Moskowitz | |
| 7,289,643 B2 | 10/2007 | Brunk et al. | |
| 7,310,815 B2 | 12/2007 | Yanovsky | |
| 7,343,492 B2 | 3/2008 | Moskowitz et al. | |
| 7,346,472 B1 | 3/2008 | Moskowitz et al. | |
| 7,362,775 B1 | 4/2008 | Moskowitz | |
| 7,363,278 B2 | 4/2008 | Schmelzer et al. | |
| RE40,334 E | 5/2008 | Maillard | |
| 7,409,073 B2 | 8/2008 | Moskowitz et al. | |
| 7,421,729 B2 | 9/2008 | Zenoni | |
| 7,444,506 B1 | 10/2008 | Datta | |
| 7,353,447 B2 | 11/2008 | Johnston | |
| 7,451,319 B1 | 11/2008 | Johnston | |
| 7,457,962 B2 | 11/2008 | Moskowitz | |
| 7,460,994 B2 | 12/2008 | Herre et al. | |
| 7,475,246 B1 | 1/2009 | Moskowitz | |
| 7,492,902 B2 | 2/2009 | Lacy | |
| 7,529,941 B1 | 5/2009 | Johnston | |
| 7,530,102 B2 | 5/2009 | Moskowitz | |
| 7,532,725 B2 | 5/2009 | Moskowitz et al. | |
| 7,568,100 B1 | 7/2009 | Moskowitz et al. | |
| 7,630,379 B2 | 12/2009 | Morishita | |
| 7,647,502 B2 | 1/2010 | Moskowitz | |
| 7,647,503 B2 | 1/2010 | Moskowitz | |
| 7,664,263 B2 | 2/2010 | Moskowitz | |
| 7,672,317 B2 | 3/2010 | Gateva | |
| 7,672,838 B1 | 3/2010 | Ellis | |
| 7,672,916 B2 | 3/2010 | Poliner | |
| 7,719,966 B2 | 5/2010 | Luft | |
| 7,725,720 B2 | 5/2010 | Moreillon | |
| 7,725,740 B2 | 5/2010 | Kudelski | |
| 7,725,808 B1 | 5/2010 | Johnston | |
| 7,743,001 B1 | 6/2010 | Vermeulen | |
| 7,761,712 B2 | 6/2010 | Moskowitz | |
| 7,779,261 B2 | 8/2010 | Moskowitz | |
| 7,802,101 B2 | 9/2010 | Johnston | |
| 7,812,241 B2 | 10/2010 | Ellis | |

(56) References Cited

U.S. PATENT DOCUMENTS

| | | |
|---|---|---|
| 7,945,781 B1 | 5/2011 | Rhoads |
| 7,950,033 B2 | 5/2011 | Pierre |
| 7,996,861 B1 | 8/2011 | Delpuch |
| 8,041,038 B2 | 10/2011 | Lacy |
| 8,095,794 B2 | 1/2012 | Johnston |
| 8,095,796 B2 | 1/2012 | Conwell et al. |
| 8,095,949 B1 | 1/2012 | Hendricks |
| 8,161,286 B2 | 4/2012 | Moskowitz |
| 8,121,343 B2 | 5/2012 | Moskowitz |
| 8,179,846 B2 | 5/2012 | Dolganow |
| 8,214,175 B2 | 7/2012 | Moskowitz |
| 8,265,278 B2 | 9/2012 | Moskowitz |
| 8,307,213 B2 | 11/2012 | Moskowitz |
| 8,356,188 B2 | 1/2013 | Kudelski |
| 8,400,566 B2 | 3/2013 | Terry |
| 8,428,185 B1 | 4/2013 | Driessen |
| 8,492,633 B2 | 7/2013 | Ellis |
| 8,949,619 B2 | 2/2015 | Parry |
| 9,070,151 B2 | 6/2015 | Moskowitz |
| 9,934,408 B2 | 4/2018 | Moskowitz |
| 2001/0010078 A1 | 7/2001 | Moskowitz |
| 2001/0029580 A1 | 10/2001 | Moskowitz |
| 2001/0043594 A1 | 11/2001 | Ogawa et al. |
| 2002/0009208 A1 | 1/2002 | Alattar |
| 2002/0010684 A1 | 1/2002 | Moskowitz |
| 2002/0026343 A1 | 2/2002 | Duenke |
| 2002/0044650 A1* | 4/2002 | Shen .................. H04L 9/32 380/30 |
| 2002/0047873 A1 | 4/2002 | Imanaka et al. |
| 2002/0056041 A1 | 5/2002 | Moskowitz |
| 2002/0057651 A1 | 5/2002 | Roberts |
| 2002/0066035 A1* | 5/2002 | Dapp ................ H04L 63/1416 726/23 |
| 2002/0069174 A1 | 6/2002 | Fox |
| 2002/0071391 A1* | 6/2002 | Ishioka .............. H04L 43/0852 370/238 |
| 2002/0071556 A1 | 6/2002 | Moskowitz et al. |
| 2002/0073043 A1 | 6/2002 | Herman et al. |
| 2002/0097873 A1 | 7/2002 | Petrovic |
| 2002/0103883 A1 | 8/2002 | Haverstock et al. |
| 2002/0152179 A1 | 10/2002 | Racov |
| 2002/0161741 A1 | 10/2002 | Wang et al. |
| 2002/0161755 A1* | 10/2002 | Moriarty ............ H04L 63/0236 |
| 2002/0188570 A1 | 12/2002 | Holliman |
| 2003/0002862 A1 | 1/2003 | Rodriguez |
| 2003/0005780 A1 | 1/2003 | Hansen |
| 2003/0021419 A1 | 1/2003 | Hansen |
| 2003/0023852 A1 | 1/2003 | Wold |
| 2003/0027549 A1 | 2/2003 | Kiel |
| 2003/0033321 A1 | 2/2003 | Schrempp |
| 2003/0126445 A1 | 7/2003 | Wehrenberg |
| 2003/0133702 A1 | 7/2003 | Collart |
| 2003/0200439 A1 | 10/2003 | Moskowitz |
| 2003/0219143 A1 | 11/2003 | Moskowitz et al. |
| 2004/0028222 A1 | 2/2004 | Sewell et al. |
| 2004/0037449 A1 | 2/2004 | Davis et al. |
| 2004/0049695 A1 | 3/2004 | Choi et al. |
| 2004/0059918 A1 | 3/2004 | Xu |
| 2004/0083369 A1 | 4/2004 | Erlingsson et al. |
| 2004/0086119 A1 | 5/2004 | Moskowitz |
| 2004/0093521 A1 | 5/2004 | Hamadeh et al. |
| 2004/0117628 A1 | 6/2004 | Colvin |
| 2004/0117664 A1 | 6/2004 | Colvin |
| 2004/0125983 A1 | 7/2004 | Reed et al. |
| 2004/0128514 A1 | 7/2004 | Rhoads |
| 2004/0225894 A1 | 11/2004 | Colvin |
| 2004/0243540 A1 | 12/2004 | Moskowitz et al. |
| 2005/0135615 A1 | 6/2005 | Moskowitz et al. |
| 2005/0160271 A9 | 7/2005 | Brundage et al. |
| 2005/0177727 A1 | 8/2005 | Moskowitz et al. |
| 2005/0246554 A1 | 11/2005 | Batson |
| 2006/0005029 A1 | 1/2006 | Petrovic et al. |
| 2006/0013395 A1 | 1/2006 | Brundage et al. |
| 2006/0013451 A1 | 1/2006 | Haitsma |
| 2006/0041753 A1 | 2/2006 | Haitsma |
| 2006/0101269 A1 | 5/2006 | Moskowitz et al. |
| 2006/0140403 A1 | 6/2006 | Moskowitz |
| 2006/0251291 A1 | 11/2006 | Rhoads |
| 2006/0285722 A1 | 12/2006 | Moskowitz et al. |
| 2007/0011458 A1 | 1/2007 | Moskowitz |
| 2007/0028113 A1 | 2/2007 | Moskowitz |
| 2007/0064940 A1 | 3/2007 | Moskowitz et al. |
| 2007/0079131 A1 | 4/2007 | Moskowitz et al. |
| 2007/0083467 A1 | 4/2007 | Lindahl et al. |
| 2007/0110240 A1 | 5/2007 | Moskowitz et al. |
| 2007/0113094 A1 | 5/2007 | Moskowitz et al. |
| 2007/0127717 A1 | 6/2007 | Herre et al. |
| 2007/0226506 A1 | 9/2007 | Moskowitz |
| 2007/0253594 A1 | 11/2007 | Lu et al. |
| 2007/0294536 A1 | 12/2007 | Moskowitz et al. |
| 2007/0300072 A1 | 12/2007 | Moskowitz |
| 2007/0300073 A1 | 12/2007 | Moskowitz |
| 2008/0005571 A1 | 1/2008 | Moskowitz |
| 2008/0005572 A1 | 1/2008 | Moskowitz |
| 2008/0016365 A1 | 1/2008 | Moskowitz |
| 2008/0022113 A1 | 1/2008 | Moskowitz |
| 2008/0022114 A1 | 1/2008 | Moskowitz |
| 2008/0028222 A1 | 1/2008 | Moskowitz |
| 2008/0046742 A1 | 2/2008 | Moskowitz |
| 2008/0075277 A1 | 3/2008 | Moskowitz et al. |
| 2008/0109417 A1 | 5/2008 | Moskowitz |
| 2008/0133927 A1 | 6/2008 | Moskowitz et al. |
| 2008/0151934 A1 | 6/2008 | Moskowitz et al. |
| 2009/0037740 A1 | 2/2009 | Moskowitz |
| 2009/0089427 A1 | 4/2009 | Moskowitz et al. |
| 2009/0190754 A1 | 7/2009 | Moskowitz et al. |
| 2009/0210711 A1 | 8/2009 | Moskowitz |
| 2009/0220074 A1 | 9/2009 | Moskowitz et al. |
| 2009/0319639 A1 | 12/2009 | Gao |
| 2010/0002904 A1 | 1/2010 | Moskowitz |
| 2010/0005308 A1 | 1/2010 | Moskowitz |
| 2010/0064140 A1 | 3/2010 | Moskowitz |
| 2010/0077219 A1 | 3/2010 | Moskowitz |
| 2010/0077220 A1 | 3/2010 | Moskowitz |
| 2010/0098251 A1 | 4/2010 | Moskowitz |
| 2010/0106736 A1 | 4/2010 | Moskowitz |
| 2010/0153734 A1 | 6/2010 | Moskowitz |
| 2010/0182570 A1 | 7/2010 | Chota |
| 2010/0202607 A1 | 8/2010 | Moskowitz |
| 2010/0220861 A1 | 9/2010 | Moskowitz |
| 2010/0313033 A1 | 12/2010 | Moskowitz |
| 2011/0019691 A1 | 1/2011 | Moskowitz |
| 2011/0069864 A1 | 3/2011 | Moskowitz |
| 2011/0128445 A1 | 6/2011 | Carrieres |
| 2012/0057012 A1 | 3/2012 | Sitrick |
| 2013/0145058 A1 | 6/2013 | Shuholm |
| 2013/0226957 A1 | 8/2013 | Ellis |

FOREIGN PATENT DOCUMENTS

| | | |
|---|---|---|
| EP | 0581317 | 2/1994 |
| EP | 0581317 A2 | 2/1994 |
| EP | 0649261 | 4/1995 |
| EP | 0651554 | 5/1995 |
| EP | 0872073 | 7/1996 |
| EP | 1028401 | 8/2000 |
| EP | 1547337 | 3/2006 |
| EP | 1354276 | 12/2007 |
| JP | H05334072 | 12/1993 |
| NL | 1005523 | 9/1998 |
| WO | WO9514289 | 5/1995 |
| WO | WO 9514289 | 5/1995 |
| WO | WO9701892 | 6/1995 |
| WO | WO9629795 | 9/1996 |
| WO | WO 9629795 | 9/1996 |
| WO | WO 9642151 | 12/1996 |
| WO | WO9642151 | 12/1996 |
| WO | WO9726733 | 1/1997 |
| WO | WO9724833 | 7/1997 |
| WO | WO 9724833 | 7/1997 |
| WO | WO9726732 | 7/1997 |
| WO | WO98002864 | 7/1997 |
| WO | WO97/43761 | 11/1997 |
| WO | WO 9744736 | 11/1997 |

(56) References Cited

FOREIGN PATENT DOCUMENTS

| WO | WO9744736 | 11/1997 |
|---|---|---|
| WO | WO97043761 | 11/1997 |
| WO | WO9802864 | 1/1998 |
| WO | WO9837513 | 8/1998 |
| WO | WO9942996 | 8/1999 |
| WO | WO 9952271 | 10/1999 |
| WO | WO9952271 | 10/1999 |
| WO | WO9962044 | 12/1999 |
| WO | WO 9962044 | 12/1999 |
| WO | WO9963443 | 12/1999 |
| WO | WO 9963443 | 12/1999 |
| WO | WO 014648 | 3/2000 |
| WO | WO 0014648 | 3/2000 |
| WO | WO0057643 | 9/2000 |
| WO | WO 0057643 | 9/2000 |
| WO | WO 01/13275 | 2/2001 |
| WO | WO0118628 | 3/2001 |
| WO | WO0143026 | 6/2001 |
| WO | WO0203385 | 1/2002 |
| WO | WO023385 A1 | 10/2002 |
| WO | WO9955089 | 3/2009 |

OTHER PUBLICATIONS

U.S. Appl. No. 12/590,681, filed Nov. 19, 2009, Dec. 15, 2010 JRE.
U.S. Appl. No. 11/897,791, filed Aug. 31, 2007, Aug. 1, 2011 JRE.
U.S. Appl. No. 12/590,553, filed Nov. 10, 2009, Aug. 1, 2011 JRE.
U.S. Appl. No. 12/592,331, filed Nov. 23, 2009, Aug. 1, 2011 JRE.
U.S. Appl. No. 11/599,964, filed Nov. 15, 2006, Aug. 1, 2011 JRE.
U.S. Appl. No. 13/212,264, filed Aug. 18, 2011, Jan. 11, 2012 JRE.
U.S. Appl. No. 08/674,726, filed Jul. 2, 1996, Aug. 1, 2011 JRE.
U.S. Appl. No. 09/545,589, filed Apr. 7, 2000, Jan. 11, 2012 JRE.
U.S. Appl. No. 11/244,213, filed Oct. 5, 2005, Jan. 11, 2012 JRE.
U.S. Appl. No. 12/009,914, filed Jan. 23, 2008, Oct. 15, 2010 JRE.
U.S. Appl. No. 12/005,230, filed Dec. 26, 2007, Oct. 15, 2010 JRE.
U.S. Appl. No. 12/803,168, filed Jun. 21, 2010, Oct. 15, 2010 JRE.
U.S. Appl. No. 11/649,026, filed Jan. 3, 2007, Aug. 1, 2011 JRE.
U.S. Appl. No. 12/803,194, filed Jun. 21, 2010, Oct. 15, 2010 JRE.
U.S. Appl. No. 12/892,900, filed Sep. 28, 2010, Nov. 8, 2010 JRE.
U.S. Appl. No. 08/365,454, filed Jan. 28, 1994, Jan. 8, 2016 JRE.
U.S. Appl. No. 08/489,172, filed Jun. 7, 1995, Aug. 1, 2011 JRE.
U.S. Appl. No. 08/775,216, filed Dec. 31, 1996, Jan. 11, 2011 JRE.
U.S. Appl. No. 08/999,766, filed Jul. 23, 1997, Oct. 15, 2010 JRE.
U.S. Appl. No. 11/894,476, filed Aug. 21, 2007, Oct. 15, 2010 JRE.
U.S. Appl. No. 11/050,779, filed Feb. 7, 2005, Oct. 15, 2010 JRE.
U.S. Appl. No. 12/802,519, filed Jun. 8, 2010, Nov. 4, 2010 JRE.
U.S. Appl. No. 12/383,916, filed Mar. 30, 2009, Oct. 15, 2010 JRE.
U.S. Appl. No. 11/894,443, filed Aug. 21, 2007, Oct. 15, 2010 JRE.
U.S. Appl. No. 12/913,751, filed Oct. 27, 2010, Nov. 8, 2010 JRE.
U.S. Appl. No. 13/803,889, filed Mar. 14, 2013, Apr. 16, 2013 JRE.
U.S. Appl. No. 08/587,943, filed Jan. 17, 1996, Jan. 11, 2012 JRE.
U.S. Appl. No. 09/046,627, filed Mar. 24, 1998, Jan. 11, 2012 JRE.
U.S. Appl. No. 10/602,777, filed Jun. 25, 2003, Aug. 1, 2011 JRE.
U.S. Appl. No. 11/512,701, filed Aug. 29, 2006, Oct. 15, 2010 JRE.
U.S. Appl. No. 11/895,388, filed Aug. 24, 2007, Oct. 15, 2010 JRE.
U.S. Appl. No. 12/655,002, filed Dec. 22, 2009, Aug. 1, 2011 JRE.
U.S. Appl. No. 13/556,420, filed Jul. 24, 2012, Sep. 17, 2012 JRE.
U.S. Appl. No. 13/794,584, filed Mar. 12, 2013, Apr. 16, 2013 JRE.
U.S. Appl. No. 14/542,712, filed Nov. 17, 2014, Jan. 8, 2016 JRE.
U.S. Appl. No. 14/855,281, filed Sep. 15, 2015, Jan. 8, 2016 JRE.
U.S. Appl. No. 09/731,039, filed Dec. 7, 2000, Jan. 11, 2012 JRE.
U.S. Appl. No. 11/647,861, filed Dec. 29, 2006, Jan. 11, 2012 JRE.
U.S. Appl. No. 12/383,879, filed Mar. 30, 2009, Oct. 15, 2010 JRE.
U.S. Appl. No. 12/886,732, filed Sep. 21, 2010, Oct. 15, 2010 JRE.
U.S. Appl. No. 13/572,641, filed Aug. 11, 2012, Oct. 11, 2012 JRE.
U.S. Appl. No. 13/794,742, filed Mar. 12, 2013, Apr. 16, 2013 JRE.
U.S. Appl. No. 14/271,559, filed May 7, 2014, Jan. 8, 2016 JRE.
U.S. Appl. No. 14/986,354, filed Dec. 31, 2015, Jan. 8, 2016 JRE.
U.S. Appl. No. 60/213,489, filed Sep. 29, 2015, Jan. 8, 2016 JRE.
U.S. Appl. No. 60/147,134, filed Aug. 4, 1999, Jan. 8, 2016 JRE.
U.S. Appl. No. 10/049,101, filed Jul. 23, 2002, Jan. 11, 2012 JRE.
U.S. Appl. No. 12/287,443, filed Oct. 9, 2008, Oct. 15, 2010 JRE.
U.S. Appl. No. 13/413,691, filed Mar. 7, 2012, Aug. 30, 2012 JRE.
U.S. Appl. No. 13/796,538, filed Mar. 12, 2013, Apr. 16, 2013 JRE.
U.S. Appl. No. 14/256,315, filed Apr. 18, 2014, Jul. 21, 2015 JRE.
U.S. Appl. No. 14/869,279, filed Sep. 29, 2015, Jan. 8, 2016 JRE.
U.S. Appl. No. 15/607,820, filed May 30, 2017, Jun. 13, 2017 JRE.
U.S. Appl. No. 09/657,181, filed Sep. 7, 2000, Jan. 11, 2012 JRE.
U.S. Appl. No. 12/005,229, filed Dec. 26, 2007, Jan. 11, 2012 JRE.
U.S. Appl. No. 12/655,357, filed Dec. 22, 2009, Oct. 15, 2010 JRE.
U.S. Appl. No. 13/035,964, filed Feb. 26, 2011, Aug. 1, 2011 JRE.
U.S. Appl. No. 13/487,119, filed Jun. 1, 2012, Apr. 16, 2013 JRE.
U.S. Appl. No. 13/802,384, filed Mar. 13, 2013, Apr. 16, 2013 JRE.
U.S. Appl. No. 14/094,987, filed Dec. 3, 2013, Jan. 6, 2016 JRE.
U.S. Appl. No. 14/727,944, filed Jun. 2, 2015, Jan. 8, 2016 JRE.
U.S. Appl. No. 60/372,788, filed Apr. 17, 2002, Jan. 8, 2016 JRE.
U.S. Appl. No. 10/417,231, filed Apr. 17, 2003, Jan. 11, 2011 JRE.
U.S. Appl. No. 11/900,065, filed Sep. 10, 2007, Oct. 15, 2010 JRE.
U.S. Appl. No. 11/900,066, filed Sep. 10, 2007, Jan. 11, 2012 JRE.
U.S. Appl. No. 12/383,289, filed Mar. 23, 2009, Aug. 1, 2011 JRE.
U.S. Appl. No. 13/273,930, filed Oct. 14, 2011, Jan. 11, 2012 JRE.
U.S. Appl. No. 13/551,097, filed Jul. 17, 2012, Apr. 16, 2013 JRE.
U.S. Appl. No. 13/488,357, filed Jun. 4, 2012, Sep. 9, 2012 JRE.
U.S. Appl. No. 13/488,395, filed Jun. 4, 2012, Sep. 9, 2012 JRE.
U.S. Appl. No. 13/970,574, filed Aug. 19, 2013, Jan. 6, 2016 JRE.
U.S. Appl. No. 09/053,628, filed Apr. 2, 1998, Jan. 11, 2012 JRE.
U.S. Appl. No. 09/644,098, filed Aug. 23, 2000, Jan. 11, 2012 JRE.
U.S. Appl. No. 11/358,874, filed Feb. 21, 2006, Jan. 11, 2012 JRE.
U.S. Appl. No. 12/799,894, filed May 4, 2010, Dec. 13, 2010 JRE.
U.S. Appl. No. 13/937,106, filed Jul. 8, 2013, Jan. 8, 2016 JRE.
U.S. Appl. No. 14/258,171, filed Apr. 22, 2014, Jan. 8, 2016 JRE.
U.S. Appl. No. 14/258,237, filed Apr. 22, 2014, Jan. 8, 2016 JRE.
U.S. Appl. No. 14/258,118, filed Apr. 22, 2014, Jan. 8, 2016 JRE.
U.S. Appl. No. 60/234,199, filed Sep. 20, 2000, Jan. 8, 2016 JRE.
U.S. Appl. No. 60/169,274, filed Dec. 7, 1999, Jan. 8, 2016 JRE.
U.S. Appl. No. 09/731,040, filed Dec. 7, 2000, Jan. 11, 2012 JRE.
U.S. Appl. No. 11/512,701, filed Aug. 29, 2006, Aug. 1, 2011 JRE.
U.S. Appl. No. 13/826,858, filed Mar. 14, 2013, Apr. 16, 2013 JRE.
U.S. Appl. No. 13/797,744, filed Mar. 12, 2013, Apr. 16, 2013 JRE.
U.S. Appl. No. 14/666,754, filed Mar. 24, 2015, May 7, 2015 JRE.
U.S. Appl. No. 60/125,990, filed Mar. 24, 1999, Jan. 8, 2016 JRE.
U.S. Appl. No. 09/594,719, filed Jun. 16, 2000, Apr. 16, 2013 JRE.
U.S. Appl. No. 11/519,467, filed Sep. 12, 2006, Apr. 16, 2013 JRE.
U.S. Appl. No. 12/655,036, filed Dec. 22, 2009, Aug. 1, 2011 JRE.
U.S. Appl. No. 13/423,650, filed Mar. 19, 2012, Jul. 26, 2012 JRE.
U.S. Appl. No. 13/802,471, filed Mar. 13, 2013, Apr. 16, 2013 JRE.
U.S. Appl. No. 14/271,382, filed May 6, 2014, Jan. 8, 2016 JRE.
U.S. Appl. No. 08/772,222, filed Dec. 20, 1996, Apr. 16, 2013 JRE.
U.S. Appl. No. 09/456,319, filed Dec. 8, 1999, Apr. 16, 2013 JRE.
U.S. Appl. No. 11/826,234, filed Dec. 30, 2004, Apr. 16, 2013 JRE.
U.S. Appl. No. 11/592,879, filed Nov. 2, 2006, Apr. 16, 2013 JRE.
U.S. Appl. No. 12/798,959, filed Apr. 14, 2010, Aug. 1, 2011 JRE.
U.S. Appl. No. 09/956,262, filed Sep. 20, 2001, Jan. 8, 2016 JRE.
U.S. Appl. No. 11/518,806, filed Sep. 11, 2006, Aug. 1, 2011 JRE.
U.S. Appl. No. 13/429,396, filed Mar. 25, 2012, Jul. 26, 2012 JRE.
U.S. Appl. No. 61/794,141, filed Mar. 15, 2013, Apr. 16, 2013JRE.
U.S. Appl. No. 61/952,823, filed Mar. 13, 2014, Jan. 8, 2016 JRE.
U.S. Appl. No. 61/953,684, filed Mar. 14, 2014, Jan. 8, 2016 JRE.
U.S. Appl. No. 14/727,944, filed Jun. 2, 2015, Feb. 21, 2017 JRE.
U.S. Appl. No. 15/900,922, filed Feb. 21, 2018 Mar. 8, 2018 RAN.
U.S. Appl. No. 15/627,012, filed Jun. 19, 2017, Sep. 26, 2018 RAN.
U.S. Appl. No. 15/620,748, filed Jun. 12, 2017, Sep. 26, 2018 RAN.
U.S. Appl. No. 15/591,848, filed May 10, 2017, Sep. 26, 2018 RAN.
U.S. Appl. No. 15/860,267, filed Jan. 2, 2018, Sep. 26, 2018 RAN.
US. Appl. No. 08/999,766, filed Jul. 23, 1997, entitled "Steganographic Method and Device", published as U.S. Pat. No. 7,568,100 Jul. 28, 2009.
EPO Application No. 96919405.9, entitled "Steganographic Method and Device"; published as EP0872073 (A2), Oct. 21, 1998.
U.S. Appl. No. 11/050,779, filed Feb. 7, 2005, entitled "Steganographic Method and Device", published as 20050177727 A1 Aug. 11, 2005.
U.S. Appl. No. 08/674,726, filed Jul. 2, 1996, entitled "Exchange Mechanisms for Digital Information Packages with Bandwidth

(56) References Cited

OTHER PUBLICATIONS

Securitization, Multichannel Digital Watermarks, and Key Management", published as U.S. Pat. No. 7,362,775 Apr. 22, 2008.
U.S. Appl. No. 09/545,589, filed Apr. 7, 2000, entitled "Method and System for Digital Watermarking", published as U.S. Pat. No. 7,007,166 Feb. 28, 2006.
U.S. Appl. No. 11/244,213, filed Oct. 5, 2005, entitled "Method and System for Digital Watermarking", published as 2006-0101269 A1 May 11, 2006.
U.S. Appl. No. 11/649,026, filed Jan. 3, 2007, entitled "Method and System for Digital Watermarking", published as 2007-0113094 A1 May 17, 2007.
U.S. Appl. No. 09/046,627, filed Mar. 24, 1998, entitled "Method for Combining Transfer Function with Predetermined Key Creation", published as U.S. Pat. No. 6,598,162 Jul. 22, 2003.
U.S. Appl. No. 10/602,777, filed Jun. 25, 2003, entitled "Method for Combining Transfer Function with Predetermined Key Creation", published as 2004-0086119 A1 May 6, 2004.
U.S. Appl. No. 09/053,628, filed Apr. 2, 1998, entitled "Multiple Transform Utilization and Application for Secure Digital Watermarking", U.S. Pat. No. 6,205,249 Mar. 20, 2001.
U.S. Appl. No. 09/644,098, filed Aug. 23, 2000, entitled "Multiple Transform Utilization and Application for Secure Digital Watermarking", published as U.S. Pat. No. 7,035,409 Apr. 25, 2006.
Jap. App. No. 2000-542907, entitled "Multiple Transform Utilization and Application for Secure Digital Watermarking"; which is a JP national stage of PCT/US1999/007262, published as WO/1999/052271, Oct. 14, 1999.
U.S. Appl. No. 09/767,733, filed Jan. 24, 2001 entitled "Multiple Transform Utilization and Application for Secure Digital Watermarking", published as 2001-0010078 A1 Jul. 26, 2001.
U.S. Appl. No. 11/358,874, filed Feb. 21, 2006, entitled "Multiple Transform Utilization and Application for Secure Digital Watermarking", published as 2006-0140403 A1 Jun. 29, 2006.
U.S. Appl. No. 10/417,231, filed Apr. 17, 2003, entitled "Methods, Systems and Devices for Packet Watermarking and Efficient Provisioning of Bandwidth", published as 2003-0200439 A1 Oct. 23, 2003.
U.S. Appl. No. 09/789,711, filed Feb. 22, 2001, entitled "Optimization Methods for the Insertion, Protection, and Detection of Digital Watermarks in Digital Data", published as 2001-0029580 A1 Oct. 11, 2001.
U.S. Appl. No. 11/497,822, filed Aug. 2, 2006, entitled "Optimization Methods for the Insertion, Protection, and Detection of Digital Watermarks in Digital Data", published as 2007-0011458 A1 Jan. 11, 2007.
U.S. Appl. No. 11/599,964, filed Nov. 15, 2006, entitled "Optimization Methods for the Insertion, Protection, and Detection of Digital Watermarks in Digital Data", published as 2008-0046742 A1 Feb. 21, 2008.
U.S. Appl. No. 11/599,838, filed Nov. 15, 2006, entitled "Optimization Methods for the Insertion, Protection, and Detection of Digital Watermarks in Digital Data", published as 2007-0226506 A1 Sep. 27, 2007.
U.S. Appl. No. 10/369,344, filed Feb. 18, 2003, entitled "Optimization Methods for the Insertion, Protection, and Detection of Digital Watermarks in Digitized Data", published as 2003-0219143 A1 Nov. 27, 2003.
U.S. Appl. No. 11/482,654, filed Jul. 7, 2006, entitled "Optimization Methods for the Insertion, Protection, and Detection of Digital Watermarks in Digitized Data", published as 2006-0285722 A1 Dec. 21, 2006.
U.S. Appl. No. 09/594,719, filed Jun. 16, 2000, entitled "Utilizing Data Reduction in Steganographic and Cryptographic Systems", published as U.S. Pat. No. 7,123,718 Oct. 17, 2006.
U.S. Appl. No. 11/519,467, filed Sep. 12, 2006, entitled "Utilizing Data Reduction in Steganographic and Cryptographic Systems", published as 2007-0064940 A1 Mar. 22, 2007.

U.S. Appl. No. 09/731,040, filed Dec. 7, 2000, entitled "Systems, Methods and Devices for Trusted Transactions", 2002-0010684 A1 Jan. 24, 2002.
U.S. Appl. No. 11/512,701, filed Aug. 29, 2006, entitled "Systems, Methods and Devices for Trusted Transactions", published as 2007-0028113 A1 Feb. 1, 2007.
U.S. Appl. No. 10/049,101, filed Feb. 8, 2002, entitled "A Secure Personal Content Server", published as U.S. Pat. No. 7,475,246 Jan. 6, 2009.
PCT Application No. PCT/US00/21189, filed Aug. 4, 2000, entitled, "A Secure Personal Content Server", Pub. No. WO/2001/018628 ; Publication Date: Mar. 15, 2001.
U.S. Appl. No. 09/657,181, filed Sep. 7, 2000, entitled "Method and Device for Monitoring and Analyzing Signals", published as U.S. Pat. No. 7,346,472 Mar. 18, 2008.
U.S. Appl. No. 10/805,484, filed Mar. 22, 2004, entitled "Method and Device for Monitoring and Analyzing Signals", published as 2004-0243540 A1 Dec. 2, 2004.
U.S. Appl. No. 09/956,262, filed Sep. 20, 2001, entitled "Improved Security Based on Subliminal and Supraliminal Channels for Data Objects", published as 2002-0056041 A1 May 9, 2002.
U.S. Appl. No. 11/518,806, filed Sep. 11, 2006, entitled "Improved Security Based on Subliminal and Supraliminal Channels for Data Objects", 2008-0028222 A1 Jan. 31, 2008.
U.S. Appl. No. 11/026,234, filed Dec. 30, 2004, entitled "Z-Transform Implementation of Digital Watermarks" , published as 2005-0135615 A1 Jun. 23, 2005.
U.S. Appl. No. 11/592,079, filed Nov. 2, 2006, entitled "Linear Predictive Coding Implementation of Digital Watermarks", published as 2007-0079131 A1 Apr. 5, 2007.
U.S. Appl. No. 09/731,039, filed Dec. 7, 2000, entitled "System and Methods for Permitting Open Access to Data Objects and for Securing Data within the Data Objects", published as 2002-0071556 A1 Jun. 13, 2002.
U.S. Appl. No. 11/647,861, filed Dec. 29, 2006, entitled "System and Methods for Permitting Open Access to Data Objects and for Securing Data within the Data Objects", published as 2007-0110240 A1 May 17, 2007.
U.S. Appl. No. 60/169,274, filed Dec. 7, 1999, entitled "Systems, Methods and Devices for Trusted Transactions".
U.S. Appl. No. 60/234,199, filed Sep. 20, 2000, "Improved Security Based on Subliminal and Supraliminal Channels for Data Objects".
U.S. Appl. No. 09/671,739, filed Sep. 29, 2000, entitled "Method and Device for Monitoring and Analyzing Signals".
U.S. Appl. No. 12/665,002, filed Dec. 22, 2009, entitled "Method for Combining Transfer Function with Predetermined Key Creation", published as 20100182570 A1 Jul. 22, 2010.
U.S. Appl. No. 12/592,331, filed Nov. 23, 2009, entitled "Optimization Methods for the Insertion, Protection, and Detection of Digital Watermarks in Digital Data", published as 20100077220 A1 Mar. 25, 2010.
U.S. Appl. No. 12/590,553, filed Nov. 10, 2009, entitled "Optimization Methods for the Insertion, Protection, and Detection of Digital Watermarks in Digital Data", published as 20100077219 A1 Mar. 25, 2010.
U.S. Appl. No. 12/590,681, filed Nov. 12, 2009, entitled "Optimization Methods for the Insertion, Protection, and Detection of Digital Watermarks in Digital Data", published as 20100064140 A1 Mar. 11, 2010.
U.S. Appl. No. 12/655,036, filed Dec. 22, 2009, entitled "Utilizing Data Reduction in Steganographic and Cryptographic Systems", published as 20100153734 A1 Jun. 17, 2010.
U.S. Appl. No. 12/655,357, filed Dec. 22, 2009, entitled "Method and Device for Monitoring and Analyzing Signals", published as 20100106736 A1 Apr. 29, 2010.
PCT Application No. PCT/US95/08159, filed Jun. 26, 1995, entitled, "Digital Information Commodities Exchange with Virtual Menuing", published as WO/1997/001892; Publication Date: Jan. 16, 1997.
PCT Application No. PCT/US96/10257, filed Jun. 7, 1996, entitled "Steganographic Method and Device"—corresponding to—EPO

(56) References Cited

OTHER PUBLICATIONS

Application No. 96919405.9, entitled "Steganographic Method and Device", published as WO/1996/042151; Publication Date: Dec. 27, 1996.
PCT Application No. PCT/US97/00651, filed Jan. 16, 1997, entitled, "Method for Stega-Cipher Protection of Computer Code", published as WO/1997/026732; Publication Date: Jul. 24, 1997.
PCT Application No. PCT/US97/00652, filed Jan. 17, 1997, entitled, "Method for an Encrypted Digital Watermark", published as WO/1997/026733; Publication Date: Jul. 24, 1997.
PCT Application No. PCT/US97/11455, filed Jul. 2, 1997, entitled, "Optimization Methods for the Insertion, Protection and Detection of Digital Watermarks in Digitized Data", published as WO/1998/002864; Publication Date: Jan. 22, 1998.
PCT Application No. PCT/US99/07262, filed Apr. 2, 1999, entitled, "Multiple Transform Utilization and Applications for Secure Digital Watermarking", published as WO/1999/052271; Publication Date: Oct. 14, 1999.
PCT Application No. PCT/US00/06522, filed Mar. 14, 2000, entitled, "Utilizing Data Reduction in Steganographic and Cryptographic Systems", published as WO/2000/057643; Publication Date: Sep. 28, 2000.
PCT Application No. PCT/US00/18411, filed Jul. 5, 2000, entitled, "Copy Protection of Digital Data Combining Steganographic and Cryptographic Techniques".
PCT Application No. PCT/US00/33126, filed Dec. 7, 2000, entitled "Systems, Methods and Devices for Trusted Transactions", published as WO/2001/043026; Publication Date: Jun. 14, 2001.
U.S. Appl. No. 60/222,023, filed Jul. 31, 2007 entitled "Method and apparatus for recognizing sound and signals in high noise and distortion".
U.S. Appl. No. 11/458,639, filed Jul. 19, 2006 entitled "Methods and Systems for Inserting Watermarks in Digital Signals", published as 20060251291 A1 Nov. 9, 2006.
"Techniques for Data Hiding in Audio Files," by Morimoto, 1995. CSG, Computer Support Group and CSGNetwork.com 1973 http://www.scgnetwork.com/glossarys.html.
*Blue Spike* v. *Roku* C.A. No. 17-928 (LPS), Bates numbered pages resulting from search of Roku Bates number range ROKU00004985-ROKU00005974 for terms 'SDMI' and Portable Device Spec. "(Bates numbered pp. ROKU 00005564 to ROKU 00005598 containing document titled "SDMI Portable Device Specification, Part 1, Version 1.0, dated " Jul. 8, 1999".
*Blue Spike* v. *Roku* C.A. No. 17-928 (LPS), Bates numbered pages resulting from search of Roku Bates numbered range ROKU00004985-ROKU00005974 for terms 'Liquid Audio,' 'Liquid Music,' and 'Liquid Server.' (Bates Numbered pp. ROKU00005948 to ROKU00005949 containing document titled "Liquid Audio Delivers Web Server and Production Tools for Online Music Commerce" dated "Mar. 12, 1997").
*Blue Spike* v. *Roku* C.A. No. 17-928 (LPS), Bates numbered pages resulting from search of Roku Bates number range ROKU00004985-ROKU00005974 for terms 'Liquid Audio,' 'Liquid Music,' and 'Liquid Server.' (Bates Numbered pp. ROKU00005952 to ROKU00005953 containing document titled "Liquid Audio to Develop Internet Technology with Dolby" dated "Aug. 26, 1996").
*Blue Spike* v. *Roku* C.A. No. 17-928 (LPS), Bates numbered pages resulting from search of Roku Bates number range ROKU00004985-ROKU00005974 for terms 'Liquid Audio,' 'Liquid Music,' and 'Liquid Server.' (Bates Numbered p. ROKU00005954 containing document titled "Liquid Audio Supports Solana's Digital Watermark System for Online Music Delivery" dated "Jan. 23, 1997").
*Blue Spike* v. *Roku* C.A. No. 17-928 (LPS), Bates numbered pages resulting from search of Roku Bates number range ROKU00004985-ROKU00005974 for terms 'Liquid Audio,' 'Liquid Music,' and 'Liquid Server.' (Bates Numbered pp. ROKU00005955 to ROKU00005956 containing document titled "IUMA Bets on Liquid Audio", dated "Dec. 6, 1998.PST").
*Blue Spike* v. *Roku* C.A. No. 17-928 (LPS), Bates numbered pages resulting from search of Roku Bates numbered range ROKU00004985-ROKU00005974 for terms 'Liquid Audio,' 'Liquid Music,' and 'Liquid Server.' (Bates Numbered pp. ROKU00005963 containing document beginning "Here is an online directory . . . " dated "Apr. 24, 1997").
2018, *Blue Spike* v. *Roku* C.A. No. 17-928 (LPS), Bates numbered pages resulting from search of Roku Bates number range ROKU00004985-ROKU00005974 for terms 'Liquid Audio,' 'Liquid Music,' and 'Liquid Server.' (Bates Numbered pp. ROKU00005964 to ROKU000065 containing document beginning "Utilizing an exclusive, enhanced version . . . " undated).
2018, *Blue Spike* v. *Roku* C.A. No. 17-928 (LPS), Bates numbered pages resulting from search of Roku Bates number range ROKU00004985-ROKU00005974 for terms 'Liquid Audio,' 'Liquid Music,' and 'Liquid Server.' (Bates Numbered p. ROKU00005966 containing document beginning "Liquid Audio is developing . . . " undated).
2018, *Blue Spike* v. *Roku* C.A. No. 17-928 (LPS), Bates numbered pages resulting from search of Roku Bates number range ROKU00004985-ROKU00005974 for terms 'Liquid Audio,' 'Liquid Music,' and 'Liquid Server.' (Bates Numbered p. ROKU00005967 containing document titled "Liquid Audio fine tunes Music on Demand", undated).
2018, *Blue Spike* v. *Roku* C.A. No. 17-928 (LPS), Bates numbered pages resulting from search of Roku Bates number range ROKU00004985-ROKU00005974 for terms 'ContentGuard' and 'Xerox Corp.' (Bates numbered pp. ROKU00005520 to ROKU00005521, containing document titled "ContentGuard Marketplace", undated).
*Blue Spike* v. *Roku* C.A. No. 17-928 (LPS), Bates numbered pages resulting from search of Roku Bates number range ROKU00004985-ROKU00005974 for terms 'ContentGuard' and 'Xerox Corp.' (Bates numbered pp. ROKU00005957 to ROKU00005958,document titled "Contentguard", undated ).
2018, *Blue Spike* v. *Roku* C.A. No. 17-928 (LPS), Bates numbered pages resulting from search of Roku Bates number range ROKU00004985-ROKU00005974 for terms 'ContentGuard' and 'Rights Server.' (Bates numbered p. ROKU00005961 to ROKU00005962, containing document titled "ContentGuard Rights Server", undated ).
2018, *Blue Spike* v. *Roku* C.A. No. 17-928 (LPS), Bates numbered pages resulting from search of Roku Bates number range ROKU00004985-ROKU00005974 for terms 'ContentGuard' and 'Publisher.' (Bates numbered p. ROKU00005959 to ROKU00005960, containing document titled "ContentGuard Publisher", undated.).
*Blue Spike* v. *Roku* C.A. No. 17-928 (LPS), Bates numbered pages resulting from search of Roku Bates number range ROKU00004985-ROKU00005974 for terms 'Solana,' 'Electronic DNA,' 'E-DNA,' and 'Solana Technology.' (Bates numbered pp. ROKU00005950 to ROKU00005951, containing document titled "Solana's E-DNA Digital Watermark Technology to Protect Audio Distributed via the Net", dated "Jan, 1997").
*Blue Spike* v. *Roku* C.A. No. 17-928 (LPS), Bates numbered pages resulting from search of Roku Bates numbered range ROKU00004985-ROKU00005974 for terms 'Solana,' 'Electronic DNA,' 'E-DNA,' and 'Solana Technology.' (Bates numbered p. ROKU00005954, containing documen titled "Liquid Audio Supports Solana's Digital Watermark System for Online Music Delivery", dated "Jan. 23, 1997").
2018, *Blue Spike* v. *Roku* C.A. No. 17-928 (LPS), Bates numbered pages resulting from search of Roku Bates number range ROKU00004985-ROKU00005974 for terms 'Digital River,' 'Digital,' and 'Secure Sales System.' (Bates numbered pp. ROKU00005773 to ROKU00005774, containing document titled "Digital River", undated).
U.S. Appl. No. 09/545,589, filed Apr. 7, 2000, entitled "Method and System for Digital Watermarking", published as 7007166 Feb. 28, 2006.
Schneier, Bruce, Applied Cryptography, 2nd Ed., John Wiley & Sons, pp. 9-10, 1996.
Menezes, Alfred J., Handbook of Applied Cryptography, CRC Press, p. 46, 1997.
Merriam-Webster's Collegiate Dictionary, 10th Ed., Merriam Webster, Inc., p. 207.

(56) References Cited

OTHER PUBLICATIONS

Brealy, et al., Principles of Corporate Finance, "Appendix A—Using Option Valuation Models", 1984, pp. 448-449.
Copeland, et al., Real Options: A Practitioner's Guide, 2001 pp. 106-107, 201-202, 204-208.
Sarkar, M. "An Assessment of Pricing Mechanisms for the Internet—A Regulatory Imperative", presented MIT Workshop on Internet Economics, Mar. 1995 http://www.press.vmich.edu/iep/works/SarkAsses.html on.
Crawford, D.W. "Pricing Network Usage: A Market for Bandwidth of Market Communication?" presented MIT Workshop on Internet Economics, Mar. 1995 http://www.press.vmich.edu/iep/works/CrawMarket.html on March.
Low, S.H., "Equilibrium Allocation and Pricing of Variable Resources Among User-Suppliers", 1988. http://www.citesear.nj.nec.com/366503.html.
Caronni, Germano, "Assuring Ownership Rights for Digital Images", published proceeds of reliable IT systems, v15 '95, H.H. Bruggemann and W. Gerhardt-Hackel (Ed) Viewing Publishing Company Germany 1995.
Zhao, Jian. "A WWW Service to Embed and Prove Digital Copyright Watermarks", Proc. of the European conf. on Multimedia Applications, Services & Techniques Louvain-La-Nevve Belgium May 1996.
Gruhl, Daniel et al., Echo Hiding. In Proceeding of the Workshop on Information Hiding. No. 1174 in Lecture Notes in Computer Science, Cambridge, England (May/Jun. 1996).
Oomen, A.W.J. et al., A Variable Bit Rate Buried Data Channel for Compact Disc, J.AudioEng. Sc., vol. 43, No. 1/2, pp. 23-28 (1995).
Ten Kate, W. et al., A New Surround-Stereo-Surround Coding Techniques, J. Audio Eng.Soc., vol. 40,No. 5,pp. 376-383 (1992).
Gerzon, Michael et al., A High Rate Buried Data Channel for Audio CD, presentation notes, Audio Engineering Soc. 94th Convention (1993).
Sklar, Bernard, Digital Communications, pp. 601-603 (1988).
Jayant, N.S. et al., Digital Coding of Waveforms, Prentice Hall Inc., Englewood Cliffs, NJ, pp. 486-509 (1984).
Bender, Walter R. et al., Techniques for Data Hiding, SPIE Int. Soc. Opt. Eng., vol. 2420, pp. 164-173, 1995.
Zhao, Jian et al., Embedding Robust Labels into Images for Copyright Protection, (xp 000571976), pp. 242-251, 1995.
Menezes, Alfred J., Handbook of Applied Cryptography, CRC Press, p. 175, 1997.
Schneier, Bruce, Applied Cryptography, 1st Ed., pp. 67-68, 1994.
Ten Kate, W. et al., "Digital Audio Carrying Extra Information", IEEE, CH 2847-2/90/0000-1097, (1990).
Van Schyndel, et al., "A digital Watermark," IEEE Int'l Computer Processing Conference, Austin,TX, Nov. 13-16, 1994, pp. 86-90.
Smith, et al. "Modulation and Information Hiding in Images", Springer Verlag, 1st Int'l Workshop, Cambridge, UK, May 30-Jun. 1, 1996, pp. 207-227.
1997, Kutter, Martin et al., "Digital Signature of Color Images Using Amplitude Modulation", SPIE-E197, vol. 3022, pp. 518-527.
Puate, Joan et al., "Using Fractal Compression Scheme to Embed a Digital Signature into an Image", SPIE-96 Proceedings, vol. 2915, Mar. 1997, pp. 108-118.
Swanson, Mitchell D.,et al., "Transparent Robust Image Watermarking", Proc. of the 1996 IEEE Int'l Conf. on Image Processing, vol. 111, 1996 , pp. 211-214.
Swanson, Mitchell D., et al. "Robust Data Hiding for Images", 7th IEEE Digital Signal Processing Workshop, Leon, Norway. Sep. 1-4, 1996, pp. 37-40.
Zhao, Jian et al., "Embedding Robust Labels into Images for Copyright Protection", Proceeding of the Know Right '95 Conference, pp. 242-251.
Koch, E., et al., "Towards Robust and Hidden Image Copyright Labeling", 1995 IEEE Workshop on Nonlinear Signal and Image Processing, Jun. 1995 Neos Marmaras pp. 4.

Van Schyandel, et al., "Towards a Robust Digital Watermark", Second Asain Image Processing Conference, Dec. 6-8, 1995, Singapore, vol. 2, pp. 504-508.
Tirkel,A.Z., "A Two-Dimensional Digital Watermark", DICTA '95, Univ. of Queensland, Brisbane, Dec. 5-8, 1995, pp. 7.
Tirkel,A.Z., "Image Watermarking—A Spread Spectrum Application", ISSSTA '96, Sep. 1996, Mainz, German, pp. 6.
O'Ruanaidh, et al. "Watermarking Digital Images for Copyright Protection", IEEE Proceedings, vol. 143, No. 4, Aug. 1996, pp. 250-256.
Cox, et al., Secure Spread Spectrum Watermarking for Multimedia, NEC Research Institute, Techinal Report 95-10, pp. 33.
Kahn, D., "The Code Breakers", The MacMillan Company, 1969, pp. xIII, 81-83, 513, 515, 522-526, 863.
Boney, et al., Digital Watermarks for Audio Signals, EVSIPCO, 96, pp. 473-480 (Mar. 14, 1997).
Dept. of Electrical Engineering, Del Ft University of Technology, Del ft The Netherlands, Cr.C. Langelaar et al.,"Copy Protection for Multimedia Data based on Labeling Techniques", Jul. 1996 9 pp.
F. Hartung, et al., "Digital Watermarking of Raw and Compressed Video", SPIE vol. 2952, pp. 205-213.
Craver, et al., "Can Invisible Watermarks Resolve Rightful Ownerships?", IBM Research Report, RC 20509 (Jul. 25, 1996) 21 pp.
Press, et al., "Numerical Recipes in C", Cambridge Univ. Press, 1988, pp. 398-417.
Pohlmann, Ken C., "Principles of Digital Audio", 3rd Ed., 1995, pp. 32-37, 40-48:138, 147-149, 332, 333, 364, 499-501, 508-509, 564-571.
Pohlmann, Ken C., "Principles of Digital Audio", 2nd Ed., 1991, pp. 1-9, 19-25, 30-33, 41-48, 54-57, 86-107, 375-387.
Schneier, Bruce, Applied Cryptography, John Wiley & Sons, Inc., New York, 1994, pp. 68, 69, 387-392, 1-57, 273-275, 321-324.
Boney, et al., Digital Watermarks for Audio Signals, Proceedings of the International Conf. on Multimedia Computing and Systems, Jun. 17-23, 1996 Hiroshima, Japan, 0-8186-7436-9196, pp. 473-480.
Johnson, et al., "Transform Permuted Watermarking for Copyright Protection of Digital Video", IEEE Globecom 1998, Nov. 8-12, 1998, New York New York vol. 2 1998 pp. 684-689 (ISBN 0-7803-4985-7).
Rivest, et al., "Pay Word and Micromint: Two Simple Micropayment Schemes," MIT Laboratory for Computer Science, Cambridge, MA, May 7, 1996 pp. 1-18.
Bender, et al., "Techniques for Data Hiding", IBM Systems Journal, (1996) vol. 35, Nos. 3 & 4,1996, pp. 313-336.
Moskowitz, "Bandwith as Currency", IEEE Multimedia, Jan.-Mar. 2003, pp. 14-21.
Moskowitz, Multimedia Security Technologies for Digital Rights Management, 2006, Academic Press, "Introduction—Digital Rights Management" pp. 3-22.
Rivest, et al., "PayWord and Micromint: Two Simple Micropayment Schemes," MIT Laboratory for Computer Science, Cambridge, MA, Apr. 27, 2001, pp. 1-18.
Tomsich, et al., "Towards a secure and de-centralized digital watermarking infrastructure for the protection of Intellectual Property", in Electronic Commerce and Web Technologies, Proceedings (ECWEB)(2000).
Moskowitz, "What is Acceptable Quality in the Application of Digital Watermarking: Trade-offs of Security; Robustness and Quality", IEEE Computer Society Proceedings of ITCC 2002 Apr. 10, 2002 pp. 80-84.
Lemma, et al. "Secure Watermark Embedding through Partial Encryption", International Workshop on Digital Watermarking ("IWDW" 2006). Springer Lecture Notes in Computer Science 2006 (to appear) 13.
Kocher, et al., "Self Protecting Digital Content", Technical Report from the CRI Content Security Research Initiative, Cryptography Research, Inc. 2002-2003 14 pages
Sirbu, M. et al., "Net Bill: An Internet Commerce System Optimized for Network Delivered Services", Digest of Papers of the Computer Society Computer Conference (Spring) Mar. 5, 1995 pp. 20-25 vol. CONF40.

(56) References Cited

OTHER PUBLICATIONS

Schunter, M. et al., "A Status Report on the SEMPER framework for Secure Electronic Commerce", Computer Networks and ISDN Systems, Sep. 30, 1998, pp. 1501-1510 vol. 30 No. 16-18 NL North Holland.
Konrad, K. et al., "Trust and Electronic Commerce—more than a technical problem," Proceedings of the 18th IEEE Symposium on Reliable Distributed Systems Oct. 19-22, 1999, pp. 360-365 Lausanne.
Kini, et al., "Trust in Electronic Commerce: Definition and Theoretical Considerations", Proceedings of the 31st Hawaii Int'l Conf on System Sciences (Cat. No. 98TB100216). Jan. 6-9, 1998. pp. 51-61. Los.
Steinauer D. D., et al., "Trust and Traceability in Electronic Commerce", Standard View, Sep. 1997, pp. 118-124, vol. 5 No. 3, ACM, USA.
Hartung, et al. "Multimedia Watermarking Techniques", Proceedings of the IEEE, Special Issue, Identification & Protection of Multimedia Information, pp. 1079-1107 Jul. 1999 vol. 87 No. 7 IEEE.
European Search Report & European Search Opinion in EP07112420.
STAIND (The Singles 1996-2006), Warner Music—Atlantic, Pre-Release CD image, 2006, 1 page.
Radiohead ("Hail to the Thief"), EMI Music Group—Capitol, Pre-Release CD image, 2003, 1 page.
Tirkel, A.Z., "A Two-Dimensional Digital Watermark", Scientific Technology, 686, 14, date unknown. (citation revised upon review on Nov. 16, 2010 by RAN.).
PCT International Search Report in PCT/US95/08159.
PCT International Search Report in PCT/US96/10257.
Supplementary European Search Report in EP 96919405.
PCT International Search Report in PCT/US97/00651.
PCT International Search Report in PCT/US97/00652.
PCT International Search Report in PCT/US97/11455.
PCT International Search Report in PCT/US99/07262.
PCT International Search Report in PCT/US00/06522.
Supplementary European Search Report in EP00919398.
PCT International Search Report in PCT/US00/18411.
PCT International Search Report in PCT/US00/33126.
PCT International Search Report in PCT/US00/21189.
Delaigle, J.-F., et al. "Digital Watermarking," Proceedings of the SPIE, vol. 2659, Feb. 1, 1996, pp. 99-110.
Schneider, M., et al. "A Robust Content Based Digital Signature for Image Authentication," Proceedings of the International Conference on Image Processing (IC. Lausanne) Sep. 16-19, 1996, pp. 227-230, IEEE ISBN.
Cox, I. J., et al. "Secure Spread Spectrum Watermarking for Multimedia," IEEE Transactions on Image Processing, vol. 6 No. 12, Dec. 1, 1997, pp. 1673-1686.
Wong, Ping Wah. "A Public Key Watermark for Image Verification and Authentication," IEEE International Conference on Image Processing, vol. 1 Oct. 4-7, 1998, pp. 455-459.
Fabien A.P. Petitcolas, Ross J. Anderson and Mulch's G. Kuhn, "Attacks on Copyright Marking Systems," LNCS, vol. 1525, Apr. 14-17, 1998, pp. 218-238 ISBN: 3-540-65386-4.
Ross Anderson, "Stretching the Limits of Steganography," LNCS, vol. 1174, May/Jun. 1996, 10 pages, ISBN: 3-540-61996-8.
Joseph J.K. O'Ruanaidh and Thierry Pun, "Rotation, Scale and Translation Invariant Digital Image Watermarking", pre-publication, Summer 1997 4 pages.
Joseph J.K. O'Ruanaidh and Thierry Pun, "Rotation, Scale and Translation Invariant Digital Image Watermarking", Submitted to Signal Processing Aug. 21, 1997, 19 pages.
OASIS (Dig Out Your Soul), Big Brother Recordings Ltd, Promotional CD image, 2008, 1 page.
Rivest, R. "Chaffing and Winnowing: Confidentiality without Encryption", MIT Lab for Computer Science, http://people.csail.mit.edu/rivest/Chaffing.txt Apr. 24, 1998, 9 pp.
PortalPlayer, PP5002 digital media management system-on-chip, May 1, 2003, 4 pp.

VeriDisc, "The Search for a Rational Solution to Digital Rights Management (DRM)", http://64.244.235.240/news/whitepaper,/docs/veridisc.sub.--white.sub.--paper.pdf, 2001, 15 pp.
Cayre, et al., "Kerckhoffs-Based Embedding Security Classes for WOA Data Hiding", IEEE Transactions on Information Forensics and Security, vol. 3 No. 1, Mar. 2008, 15 pp.
Wayback Machine, dated Jan. 17, 1999, http://web.archive.org/web/19990117020420/http://www.netzero.com/, accessed on Feb. 19, 2008.
Namgoong, H., "An Integrated Approach to Legacy Data for Multimedia Applications", Proceedings of the 23rd EUROMICRO Conference, vol., Issue 1-4, Sep. 1997, pp. 387-391.
Wayback Machine, dated Aug. 26, 2007, http://web.archive,org/web/20070826151732/http://www.screenplaysmag.com/t-abid/96/articleType/ArticleView/articleId/495/Default.aspx/.
"YouTube Copyright Policy: Video Identification tool—YouTube Help", accessed Jun. 4, 2009, http://www.google.com/support/youtube/bin/answer.py?hl=en&answer=83766, 3 pp.
PCT Application No. PCT/US00/18411, filed Jul. 5, 2000, entitled, "Copy Protection of Digital Data Combining Steganographic and Cryptographic Techniques". This application published with publication No. WO/2002/003385.
PCT Application No. PCT/US00/33126, filed Dec. 7, 2000 entitled "Systems, Methods and Devices for Trusted Transactions", published as WO/2001/043026; Publication Date: Jun. 14, 2001. This application published with publication No. WO/2001/043026.
EPO Divisional Patent Application No. 07112420.0, entitled "Steganographic Method and Device" corresponding to PCT Application No. PCT/US96/10257, published as WO/1996/042151, Dec. 27, 1996.
Howe, Dennis Jul. 13, 1998 http://foldoc.org//steganography.
CSG, Computer Support Group and CSGNetwork.com 1973 http://www.csgnetwork.com/glossarys.html.
QuinStreet Inc. 2010 What is steganography?—A word definition from the Webopedia Computer Dictionary http://www.webopedia.com/terms/steganography.html.
Graham, Robert Aug. 21, 2000 "Hacking Lexicon" http://robertgraham.com/pubs/hacking-diet.html.
Farkex, Inc 2010 "Steganography definition of steganography in the Free Online Encyclopedia" http://encyclopedia2.Thefreedictionary.com/steganography.
Horowitz, et al., The Art of Eletronics. $2^{nd}$ Ed., 1989, pp. 7.
Jimmy eat world ("futures"), Interscope Records, Pre-Release CD image, 2004, 1 page.
Aerosmith ("Just Push Play"), Pre-Release CD image, 2001, 1 page.
Phil Collins(Testify) Atlantic, Pre-Release CD image, 2002, 1 page.
U. are U. Reviewer's Guide (U are U Software, 1998).
U. are U. wins top honors!—Marketing Flyer (U. are U. Software, 1998).
Digital Persona, Inc., *U. are U. Fingerprint Recognition System: User Guide* (Version 1.0, 1998).
Digital Persona White Paper pp. 8-9 published Apr. 15, 1998.
Digital Persona, Inc., "Digital Persona Releases U. are. U Pro Fingerprint Security Systems for Windows NT, 2000, '98, '95", (Feb. 2000 ).
SonicWall, Inc. 2011 "The Network Security SonicOS Platform-Deep Packet Inspection" http://www.sonicwall.com/us/en/products/Deep_Packet_Inspection.html.
Rick Merritt, PARC hosts summit on content-centric nets, EETimes, Aug. 12, 2011, http://www.eetimes.com/electronics-news/4218741/PARC-hosts-summit-on-content-centric-nets.
Afanasyev, et. al., Communications of the ACM: Privacy Preserving Network Forensics 2011.
SonicWall, Inc., 2008 "The Advantages of a Multi-core Architecture in Network Security Appliances" http://www.sonicwall.com/downloads/WP-ENG-010_Multicore . . . .
Voip-Pal.Com Inc's Lawful Intercept Patent Application Receives the Allowance for Issuance as a Patent, http://finance.yahoo.com/news/voip-pal-com-inc-lawful-133000133.html.
Deep Content Inspection—Wikipedia, the free encyclopedia, http://en.wikipedia.org/wiki/Deep_content_inspection (last visited Apr. 4, 2013).

(56) References Cited

OTHER PUBLICATIONS

Dexter, et. al, "Multi-view Synchronization of Human Actions and Dynamic Scenes" pp. 1-11, 2009.
Kudrle, et al., "Fingerprinting for Solving A/V Synchronization Issues within Broadcast Environments", 2011.
Junego, et. al., "View-Independent Action Recognition from Temporal Self-Similarities", 2011.
Dexter, et al., "Multi-view Synchronization of Image Sequences", 2009.
*Blue Spike, LLC.* v. *Texas Instruments, Inc et. al,* (No. 6:12-CV-499-MHS), Audible Magic Corporations's amended Answer ( E.D. TX filed Jul. 15, 2013) (Document 885 p. ID 9581), (PACER).
Moskowitz, "Introduction-Digital Rights Management," Multimedia Security Technologies for Digital Rights Management (2006), Elsevier.
George, Mercy; Chouinard, Jean-Yves; Georgana, Nicolas. Digital Watermarking of Images and video using Direct Sequence Spread Spectrum Techniques. 1999 IEEE Canadian Conference on Electrical and Computer Engineering vol. 1. Pub. Date: 1999 Relevant pp. 116-121. http://ieeexplore.ieee.org/stamp/stamp.jsp?tp=arnumber=807181.
Apr. 4, 2014 Shazam Entertainment Limited's Amended Answer to Blue Spike, LLC's complaint and counterclaims against *Blue Spike LLC, Blue Spike, Inc and Scott A. Moskowitz , Shazam Entertainment Ltd* v. *Blue Spike, LLC, Blue Spike, Inc, and Scott Moskowitz* (E.D.T.X Dist Ct.) Case No. 6:12-CV-00499-MHS.
Apr. 4, 2014 Audible Magic Corporation's Second Amended Answer to Blue Spike LLC's Original Complaint for patent infringement and counterclaims against Blue Spike LLC, Blue Spike, Inc and Scott Moskowitz. *Blue Spike LLC* v. *Texas Instruments, Audible Magic Corporation* (E.D.T.X Dist Ct.) Case No. 6:12-CV-499-MHS.
Dec. 19, 2011 Shrivastava, et.al. ,"Data-Driven Visual Similarity for Cross-Domain Image Matching", 2011 ACM Transaction of Graphics (TOG), ACM SIGGRAPH Asia vol. 30 No. 6, http://graphics.cs.cmu.edu/projects/crossDomainMatching/.
Spice, Byron, "Carnegie Mellon Researchers Develop Computerized Method for Finding Similar Images in Photos, Paintings, Sketches", Carnegie Mellon News, Dec. 6, 2011, Carnegie Mellon University. http://www.cmu.edu/news/stories/archives/2011/december/dec6_matchingimages.html.
Oct. 16, 2014 Memorandum Opinion and Order, *Blue Spike LLC* v. *Texas Instruments, Inc. et al.,* (E.D.T.X Dist Ct), Case No. 6:12-CV-0499-MHS-CMC (Doc#1831 PageID#27507).
Oct. 16, 2014 Memorandum Opinion and Order, *Blue Spike LLC* v. *Texas Instruments, Inc. et al.,* (E.D.T.X Dist Ct), Case No. 6:12-CV-0499-MHS-CMC (Doc#1834 PageID#27597).
Yu, Che-Fn,"Access Control and Authorization Plan for Customer Control of Network Services", IEEE GLOBECOM 1989 Pub 1989. pp. 862-869. http://ieeexplore.ieee.org/stamp/stamp.jsp?tp=&arnumber=64085.
Jaeger, Trent; Prakash, Atul; Rubin, Aviel D, "A System Architecture for Flexible Control of Downloaded Executable Content." Proceedings of the Fifth International Workshop on Object-Oreintation in Operating Systems. Pub 1996, pp. 14-18. http://ieeexplore.ieee.org/stamp/stamp.jsp?tp=&arnumber=557855.
"Activate Your Product Through the Online License Management System (LMS)", May 2011 Juniper Networks, Inc., USA.
"Activate Your Software Capacity and/or Features", May 2011, Juniper Networks, USA.
"Download and Activate Your Software", May 2011, Juniper Networks, Inc., USA.
"Electronic Fulfillment of Feature, Capacity and Subscription License Activation Keys via the License Management System (LMS)", Sep. 2009, Juniper Networks, Inc., USA.
"Juniper Networks License Management System (LMS) FAQ", Jul. 2009, Juniper Networks, Inc., USA.
"License Activation Keys", Dec. 14, 2014, http://www.juniper.net/generate_license/.

"License code and configuration key reference [AX 2012]", Mar. 25, 2014, Microsoft http://technet.microsoft.com/en-us/library/hh378074.aspx.
"License Codes", Dec. 14, 2014, Oracle http://www.oracle.com/us/support/licensecodes/index.html.
"PeopleSoft Enterprise: License Codes", Dec. 14, 2014, http://www.oracle.com/us/support/licensecodes/peoplesoft-enterprise/index.html.
"Primavera License Key Files", Dec. 14, 2014, http://www.oracle.com/us/support/licensecodes/primavera/index.html.
"How to transfer a license activation key to an RMA replacement device", Mar. 2009, Juniper Networks, Inc. USA.
"How to register a license key in My VMware (2011177)", Dec. 14, 2014, http://kb.vmware.com/selfservice/microsites/search.do?cmd=displayKC&docType=ex&bbid=TSEBB_1334428459608&url=&stateId=1%200%20462914399&dialogID=462898852&docTypeID=DT_KB_1_1&externalId=2011177&sliceId=1&rfId=.
Chaussee, "Inside Windows Product Activation", Jul. 2001, http://www.licenturion.com/xp.
"How to generate and validate a software key license", Dec. 14, 2014, Stack Overflow, http://stackoverflow.com/questions/599837/how-to-generate-and-validate-a-software-license-key.
DONSW, "License Key Generation", Jul. 2005, Code Project, http://www.codeproject.com/articles/11012/License-Key-Generation.
"How are Software License Keys generated?", Dec. 14, 2014, Stack Overflow, http://stackoverflow.com/questions/3002067/how-are-software-license-keys-generated.
Decision on Appeal, USPTO PTAB Appeal No. 2012-011854 for application U.S. Appl. No. 11/895,388 issued Mar. 12, 2015.
Lacy, Jack; Snyder, James H.: Maher, David P. "Music on the Internet and the Intellectual Property Protection Problem". Proceedings of the IEEE International Symposium on Industrial Electronics, 1997m ISIE '97 vol. 1. pp. SS77-SS833. http://ieeexplore.ieee.org/stamp/stamp.jsp?tp=&arnumber-707419.
Kohl, Ulrich; Lotspiech, Jeffrey; Nusser, Stefan, "Security for the Digital Library—Protecting Documents Rather Than Channesl Proceedings". Ninth International Workshop on Database and Expert Systems Applications, 1998, pp. 316-321. http://ieeexplore.ieee.org/stamp/stamp/jsp?tp=&arnumber=707419.
Von Faber, Eberhard; Hammelrath, Robert; Franz-Peter. The Secure Distribution of Digital Contents. Proceedings, $13^{th}$ Annual Computer Security Applications Conference, 1997. pp. 16-22. http://ieeexplore.ieee.org/stamp/stamp.jsp?tp=&arnumber=651739.
2015, Order Granting Motion for Judgment on the Pleadings, *Blue Spike, LLC* v. *Google Inc.* (N.D.Cal. Dist Ct.) Case No. 14-cv-01650-YGR.
2017, Order Denying Petition for Panel Rehearing and Rehearing en Banc, *Blue Spike, LLC* v. *Google Inc.* (N.D.C.A. Dist Ct.) Case No. 4:14-cv-01650-YGR.
Augot, Daniel, "Secure Delivery of Images over Open Networks", Proceedings of the IEEE, vol. 87, Issue 7, Jul. 1999, Abstract. http://ieeexplore.ieee.org/stamp/stamp.jsp?arnumber=771076.
*Blue Spike, LLC* v. *Google, Inc,* 2016-1054 (Fed. Cir. Oct. 14, 2016), judgement adverse to Blue Spike, LLC.
*Blue Spike LLC* v. *Google, Inc.,* 16-1223 (Jun. 12, 2017) denial of writ of certiorari.
2018 Declaration of Dr. Anna Lysyanskaya ("Lysyanskaya Declaration") in Reexam 90014152.
Augot, Daniel, "Secure Delivery of Images over Open Networks", Proceedings of the IEEE, vol. 87, Issue 7, Jul. 1999, pp. 1251-1266.
2018, Plaintiff Blue Spike, LLC's Proposed Terms for Construction, Pursuant to Patent Rule (P.R.) 4-2 in *Blue Spike, LLC* v. *Juniper Networks, Inc.,* Case No. 6:17-cv-16-KNM (E.D. Tex.).
2018, English Translation of JP H05334072 (Beetcher '072).
2018, Declaration of Dr. Claudio Silva ("Silva Declaration") filed in reexam 90014138.
2018, Declaration of Dr. Claudio Silva ("Silva Declaration") filed in reexam 90014137.
Ex 1003 in IPR2017-01061, Oded Goldreich, Towards a Theory of Software Protection and Simulation by Oblivious RAMs, 1987, Symposium on Theory of Computing 182-194 (May 1987) ("Goldreich").

(56) References Cited

OTHER PUBLICATIONS

Ex 1004 in IPR2017-01061, Rafail Ostrovsky, Software Protection and Simulation on Oblivious RAMs (May 17, 1992) (MIT Ph.D. Thesis) ("Ostrovsky 1992").
Ex 1006 Rafail Ostrovsky, Efficient Computation on Oblivious RAMs, 1990 Symposium on Theory of Computing 514-523 (May 1990) ("Ostrovsky 1990").
1990, Ex 1007 in IPR2017-01061, Expert Declaration of Rafail Ostrovsky, Ph.D.
Ex 1008 in IPR2017-01061, Claim Construction Order entered May 16, 2016 in an unrelated litigation, *Blue Spike, LLC* v. *Huawei Techs. Co. et al.*, Case No. 6:13-cv-00679, Dkt. 194.
Ex 1005 in IPR2017-01109, Stephanie Forrest et al., Building Diverse Computer Systems, The Sixth Workshop on Hot Topics in Operating Systems, 67-71 (IEEE, May 1997) ("Forrest").
2017, Ex 1008 in IPR2017-01109, Expert Declaration of Rafail Ostrovsky, Ph.D.
2018, C.A. No. 17-928 (LPS), "Defendant's Initial Invalidity Contentions".
*Blue Spike* v. *Roku* C.A. No. 17-928 (LPS), Bates numbered pages resulting from search of Roku Bates number range ROKU00004985-ROKU00005974 for terms 'Liquid Audio,' 'Liquid Music,' and 'Liquid Server.' (Bates Numbered pp. ROKU00005948 to ROKU00005949 containing document titled "Liquid Audio Delivers Web Server and Production Tools for Online Music Commerce" dated "Mar. 12, 1997").
*Blue Spike* v. *Roku* C.A. No. 17-928 (LPS), Bates numbered pages resulting from search of Roku Bates numbered range ROKU00004985-ROKU00005974 for terms 'Liquid Audio,' 'Liquid Music,' and 'Liquid Server.' (Bates Numbered pp. ROKU00005952 to ROKU00005953 containing document titled "Liquid Audio to Develop Internet Technology with Dolby" dated "Aug. 26, 1996").
*Blue Spike* v. *Roku* C.A. No. 17-928 (LPS), Bates numbered pages resulting from search of Roku Bates number range ROKU00004985-ROKU00005974 for terms 'Liquid Audio,' 'Liquid Music,' and 'Liquid Server.' (Bates Numbered p. ROKU00005954 containing document titled "Liquid Audio Supports Solana's Digital Watermark System for Online Music Delivery" dated "Jan. 23, 1998").
*Blue Spike* v. *Roku* C.A. No. 17-928 (LPS), Bates numbered pages resulting from search of Roku Bates number range ROKU00004985-ROKU00005974 for terms 'Liquid Audio,' 'Liquid Music,' and 'Liquid Server.' (Bates Numbered pp. ROKU00005955 to ROKU00005956 containing document titled "IUMA Bets on Liquid Audio", dated "Dec. 3, 1998.PST").
*Blue Spike* v. *Roku* C.A. No. 17-928 (LPS), Bates numbered pages resulting from search of Roku Bates number range ROKU00004985-ROKU00005974 for terms 'Liquid Audio,' 'Liquid Music,' and 'Liquid Server.' (Bates Numbered pp. ROKU00005963 containing document beginning "Here is an online directory . . . " dated "Apr. 24, 1997").
*Blue Spike* v. *Roku* C.A. No. 17-928 (LPS), Bates numbered pages resulting from search of Roku Bates No. range ROKU00004985-ROKU00005974 for terms 'ContentGuard' and 'Xerox Corp.' (Bates numbered pp. ROKU00005957 to ROKU00005958, document titled "Contentguard", undated ).
*Blue Spike* v. *Roku* C.A. No. 17-928 (LPS), Bates numbered pages resulting from search of Roku Bates number range ROKU00004985-ROKU00005974 for terms 'Solana,' 'Electronic DNA,' 'E-DNA,' and 'Solana Technology.' (Bates numbered p. ROKU00005954, containing documen titled "Liquid Audio Supports Solana's Digital Watermark System for Online Music Delivery", dated "Jan. 23, 1997").
Index identifying Bates numbers pages containing alleged prior art, provided by defendant Roku in *Blue Spike* v *Roku* ligation, *Blue Spike* v. *Roku* C.A. No. 17-928 (LPS).
ROKU5516-7, C. Guglielmo, Net Music with a Watermark, Jan. 17, 1999.
ROKU5518-19 Boscardin, Apr. 30, 1997.
ROKU 5520-5521 ContentGuard, Apr. 7, 2000.
ROKU 0000553, Nov. 2, 1998.
ROKU5600-02,Jan. 17, 1999.
ROKU5967-74 Giles, Jun. 19, 1997.
Expert Report of Dr. Markus Jakobsson, Ph.D. Dec. 3, 2018.
Exhibits A-1 to A-5 of L-301.
2018, Exhibits B-1 to B-5 of L-301.
2018, Exhibits C-1 to C-5 of L-301.
2018, Exhibits D-1 to D-5 of L-301.
2018, Exhibits E-1 to E-5 of L-301.
Tamper Resistant Software: An Implementation. Date unknown.
2018, Creating multi-DRM protected videos with free tools—Axinom.
Hellmanm, New Directions in Cryptography, IEEE Transactions on Information Theory, vol. IT-22, No. 6, Nov. 1976.
DIVX (Digital Video Express) (1998-1999).
Electronic Watermark.
First open source W3C EME solution provided on the 96Boards HiKey platform Posted on Tuesday, Jun. 14, 2016 in Blog (/categories/#blog) by Linaro (/author/linaro/) Authors: Mark Gregotski and Zoltan Kuscsik.
WasApple.
Surviving a Standards War: Lessons Learned from the Life and Death of DIVX David Dranove and Neil Gandall Jan. 2004.
Testing Digital Watermark Resistance to Destruction Sabrina Sowers and Abdou Youssef† The George Washington University Department of Electrical Engineering and Computer Science Washington, DC USA 20052 {sowers, youssef} @seas.gwu.edu.
Information Hiding|A Survey Fabien A. P. Petitcolas, Ross J. Anderson and Markus G. Kuhn, Proceedings of the IEEE, special issue on protection of multimedia content, 87(7):1062{1078, Jul. 1999.
On Software Protection via Function Hiding Tomas Sander and Christian F. Tschudin International Computer Science Institute, Date unknown.
1998, Continuous Steganographic Data Transmission Using Uncompressed Audio Chr. Neubauer, J. Herre, and K. Brandenburg Fraunhofer Institut fur Integrierte Schaltungen, 91058 Erlangen, Germany.
Music and Media, Jan. 27, 2001, vol. 18, Issue 5.
Microsoft Unveils Windows Media Player for Palm-Size and Pocket PCs, Jan. 6, 2000.
Marlin founders release technology specifications and announce developer conferences Open specifications for protected content sharing technology and community development initiatives to drive interoperability Sunnyvale, CA, May 8, 2006.
Marlin DRM Announces Solution for Enhanced Content Protection (ECP) for UHD Content Jan. 15, 2018 03:01 AM Eastern Standard Time.
Linaro Clear Key, Jan. 2015.
2018, Legacy Windows Media License Agreements Applies to: Windows Media Player.
Unlocking the iPod Jon Johansen became a geek hero by breaking the DVD code. Now he's liberating iTunes—whether Apple likes it or not. By Robert Levine, Fortune Oct. 23 2006: 2:54 PM EDT.
Exploring Steganography: Seeing the Unseen by Neil Johnson and Sushil Jajoda, Hua Li, Oct. 6, 1999, date Unknown.
Intellectual Property Protection Systems and Digital Watermarking Jack Lacy, Schuyler R. Quackenbush, Amy Reibman, James H. Snyder, date unknown.
The Incredibly Technical History of Digital Rights Management, Ernie Smith 10, 19, 2017.
Robust Digital Watermarking Based on Key-Dependent Basis Functions Jiri Fridrich, date unknown.
DI 36 Feb. 26, 2019 Statement Joint Claim Construction and Prehearing Statement, Case 2:19-cv-00748-JAK-JPR Document 36.
DI 39 Mar. 5, 2019 Brief filed by def Opening Claim Construction Brief, Case 2:19-cv-00748-JAK-JPR Document 39.
DI 40 Mar. 5, 2019 Opening Claim Construction Brief, Case 2:19-cv-00748-JAK-JPR Document 40.
Mar. 10, 2019 Email identifying copyright registration titled "Giovanni Master (audio digital watermark source code)", Claimant Scott Moskowitz, Registration No./Date "TXu000892516/Feb. 8, 1999"; and Date of Creation: "1999."

(56) References Cited

OTHER PUBLICATIONS

1997, Merriam-Webster's Collegiate Dictionary, 10th Ed., Merriam Webster, Inc., p. 207.
1993 Gerzon, Michael et al., A High Rate Buried Data Channel for Audio CD, presentation notes, Audio Engineering Soc. 94th Convention (1993).
Johnson, et al., "Transform Permuted Watennarking for Copyright Protection of Digital Video", IEEE Globecom 1998, Nov. 8-12, 1998, New York New York vol. 2 1998 pp. 684-689 (ISBN 0-7803-4985-7).
2006, STAIND (The Singles 1996-2006), Warner Music—Atlantic, Pre-Release CD image, 2006, 1 page.
2003, Radiohead ("Hail to the Thief"), EMI Music Group—Capitol, Pre-Release CD image, 2003, 1 page.
LPCT International Search Report in PCT/US00/06522.
Fabien A.P. Petitcolas, Ross J. Anderson and Markkus G. Kuhn, "Attacks on Copyright Marking Systems," LNCS, vol. 1525, Apr. 14-17, 1998, pp. 218-238 ISBN: 3-540-65386-4.
Joseph J.K. O'Ruanaidh and Thieny Pun, "Rotation, Scale and Translation Invariant Digital Image Watermarking", pre-publication, Simmer 1997 4 pages.
PCT Application No. PCT/US95/08159, filed Jun. 26, 1995, entitled, "Digital Information Conunodities Exchange with Virtual Menuing", published as WO/1997/001892; Publication Date: Jan. 16, 1997.
Graham, Robert Aug. 21, 2000 "Hacking Lexicon" http://robertgraham.com/pubs/hacking-dict.html.
Farkex, Inc 2010 "Steganography definition of steganography in the Free Online Encyclopedia" http://encyclopedia2.Thefreedictionaty.com/steganography.
Phil Collins(Testify) Atlantic, Pit-Release CD image, 2002, 1 page.
Deep Content Inspection—Wikipedia, the free encyclopedia, http://en.wikipedia.org/wilci/Deep_content_inspection (last visited Apr. 4, 2013).
Dec. 19, 2011, Shrivastava, et.al. ,"Data-Driven Visual Similarity for Cross-Domain Image Matching", ACM Transaction of Graphics (TOG), ACM SIGGRAPH Asia vol. 30 No. 6, http://graphics.cs.cmu.edu/projects/crossDomainMatching/.
Jaeger, Trent; Prakash, Atul; Rubin, Avid D, "A System Architecture for Flexible Control of Downloaded Executable Content." Proceedings of the Fifth International Workshop on Object-Oreintation in Operating Systems. Pub 1996, pp. 14-18. http://ieeexplore.ieee.org/stamp/stampj sp?tp=&arnumber=557855.
"Siebel License Keys", Dec. 14, 2014, http://www.oracle.com/us/support/licensecodes/siebel/index.html.
Decision on Appeal, USPTO PTAB Appeal No. 2012-011854 for U.S. Appl. No. 11/895,388 issued Mar. 12, 2015.
1997, Lacy, Jack; Snyder, James H.: Maher, David P. "Music on the Internet and the Intellectual Property Protection Problem". Proceedings of the IEEE International Symposium on Industrial Electronics, 1997m ISIE '97 vol. 1. pp. SS77-SS833. http://ieeexplore.ieee.org/stamp/stamp.jsp?tp=&arnumber=707419.
Order Granting Motion for Judgment on the Pleadings, *Blue Spike, LLC* v. *Google Inc.* (N.D.Cal. Dist Ct.) Case No. 14-cv-01650-YGR.
1990, Ex 1007 in IPR2017-01061. Expert Declaration of Rafail Ostrovskv. Ph.D.
*Blue Spike* v. *Roku* C.A. No. 17-928 (LPS). Bates numbered pages resulting from search of Roku Bates No. range ROKU00004985-ROKU00005974 for terms 'Liquid Audio,' 'Liquid Music,' and 'Liquid Server.' (Bates Numbered pp. ROKU00005948 to ROKU00005949 containing document titled "Liquid Audio Delivers Web Server and Production Tools for Online Music Commerce" dated "Mar. 12. 1997").

*Blue Spike* v. *Roku* C.A. No. 17-928 (LPS), Bates numbered pages resulting from search of Roku Bates No. range ROKU00004985-ROKU00005974 for terms 'Liquid Audio,' 'Liquid Music,' and 'Liquid Server.' (Bates Numbered p. ROKU00005954 containing document titled "Liquid Audio Supports Solana's Digital Watermark System for Online Music Delivery" dated "Jan. 23, 1997").
2018, *Blue Spike* v. *Roku* C.A. No. 17-928 (LPS), Bates numbered pages resulting from search of Roku Bates No. range ROKU00004985-ROKU00005974 for terms 'ContentGuard' and 'Rights Server.' (Bates numbered p. ROKU00005961 to ROKU00005962, containing document titled "ContentGuard Rights Server", undated ).
2018, Index identifying Bates numbers pages containing alleged prior art, provided by defendant Roku in *Blue Spike* v *Roku* ligation, *Blue Spike* v. *Roku* C.A. No. 17-928 (LPS).
U.S. Appl. No. 13/970,574.
U.S. Appl. No. 15/456,522, filed Mar. 11, 2017, May 2, 2017 JRE.
Gruhi, Daniel et al., Echo Hiding. In Proceeding of the Workshop on Information Hiding. No. 1174 in Lecture Notes in Computer Science, Cambridge, England (May/Jun. 1996).
Swanson, Mitchell D., et al. "Robust Data Hiding for Images", 7th IFEF Digital Signal Processing Workshop, Leon, Norway. Sep. 1-4, 1996, pp. 37-40.
U.S. Appl. No. 60/169,274, filed Dec. 7, 1999, entitled "Systems, Methods and Devices for Trusted Transaction".
Cayre, et al., "Kercldioffs-Based Embedding Security Classes for WOA Data Hiding", IEEE Transactions on Information Forensics and Security, vol. 3 No. 1, Mar. 2008, 15 pp.
"YouTube Copyright Policy: Video Identification tool—YouTube Help", accessed Jun. 4, 2009, http://www.google.com/support/youtube/bin/answer.py?h1=en&answer=83766, 3 pp.
Shrivastava, et.al. ,"Data-Driven Visual Similarity for Cross-Domain Image Matching", Dec. 19, 2011 ACM Transaction of Graphics (TOG), ACM SIGGRAPH Asia vol. 30 No. 6, http://graphics.cs.cmu.edu/projects/crossDomainMatching/.
Jaeger, Trent; Prakash, Awl; Rubin, Aviel D, "A System Architecture for Flexible Control of Downloaded Executable Content." Proceedings of the Fifth International Workshop on Object-Oreintation in Operating Systems. Pub 1996, pp. 14-18. http://ieeexplore.ieee.org/stamp/stamp.jsp?tp=&arnumber=557855.
Von Faber, Eberhard; Hammelrath, Robert; Franz-Peter. The Secure Distribution of Digital Contents. Proceedings, 13th Annual Computer Security Applications Conference, 1997. pp. 16-22. http://ieeexplore.ieee.org/stamp/stamp.jsp?t&arnumber=651739.
2015, Order Granting Motion for Judgment on the Pleadings, *Blue Spike, LLC* v. *Google Inc.* (N.D.C.A Dist Ct.) Case No. 14-cv-01650-YGR.
Schreier, Bruce, Applied Cryptography, 2nd Ed., John Wiley & Sons, pp. 9-10, 1996.
Kutter, Martin et al., "Digital Signature of Color Images Using Amplitude Modulation", SPIE-E197, vol. 3022, pp. 518-527.
PCT Application No. PCT/US97/11455, filed Jul. 2, 1997, entitled, "Optimization Methods for the Insertion, Protection and Detection of Digital Watermarks in Digitized Data", published as WO/1998/002864; Publication Date: Jan. 22, 2018.
2013, Voip-Pal.Com Inc's Lawful Intercept Patent Application Receives the Allowance for Issuance as a Patent, http://finance.yahoo.com/news/voip-pal-com-inc-lawful-133000133.html.
Shrivastava, et.al. ,"Data-Driven Visual Similarity for Cross-Domain Image Matching", 2011 ACM Transaction of Graphics (TOG), ACM SIGGRAPH Asia vol. 30 No. 6, http://graphics.cs.cmu.edu/projects/crossDomainMatching/.
2018, Exhibits A-1 to A-5 of L-301.
Creating multi-DRM protected videos.with free tools—Axinom.

\* cited by examiner

METHODS, SYSTEMS AND DEVICES FOR PACKET WATERMARKING AND EFFICIENT PROVISIONING OF BANDWIDTH

RELATED APPLICATIONS

This application is a division of application Ser. No. 13/970,574, filed Aug. 19, 2013, which is a continuation of application Ser. No. 13/551,097, filed Jul. 17, 2012, now U.S. Pat. No. 8,706,570, which is a division of application Ser. No. 11/900,065, filed Sep. 10, 2007, now U.S. Pat. No. 8,224,705, which is a division of application Ser. No. 10/417,231, filed Apr. 17, 2003, now U.S. Pat. No. 7,287,275, which claims benefit to Provisional Application No. 60/372,788, filed Apr. 17, 2002. Application Ser. No. 13/970,574, filed Aug. 19, 2013, application Ser. No. 13/551,097, filed Jul. 17, 2012, application Ser. No. 11/900,065 and Provisional Application No. 60/372,788 are each incorporated herein by reference in their entirety;

and application Ser. No. 13/551,097, filed Jul. 17, 2012, now U.S. Pat. No. 8,706,570, is a continuation of application Ser. No. 13/273,930, filed Oct. 14, 2011, now U.S. Pat. No. 8,473,746, which is a continuation of application Ser. No. 12/383,289, filed Mar. 23, 2009, now U.S. Pat. No. 8,104,079, which is a continuation of application Ser. No. 11/900,066, filed Sep. 10, 2007, now U.S. Pat. No. 7,530,102, which is a continuation of application Ser. No. 10/417,231, filed Apr. 17, 2003, now U.S. Pat. No. 7,287,275, which claims benefit to Provisional Application No. 60/372,788, filed Apr. 17, 2002.

This application is also related to the following applications: U.S. patent application Ser. No. 09/046,627, filed Mar. 24, 1998, entitled "Method for Combining Transfer Function with Predetermined Key Creation", issued as U.S. Pat. No. 6,598,162; U.S. patent application Ser. No. 09/644,098, filed Aug. 23, 2000, entitled "Multiple Transform Utilization and Application for Secure Digital Watermarking", issued as U.S. Pat. No. 7,035,409; and U.S. patent application Ser. No. 09/767,733, filed Jan. 24, 2001, entitled "Multiple Transform Utilization and Application for Secure Digital Watermarking". The previously identified patents and/or patent applications are hereby incorporated by reference, in their entireties.

Each of the following applications is incorporated by reference, in its entirety: U.S. patent application Ser. No. 09/594,719, filed Jun. 16, 2000, entitled "Utilizing Data Reduction in Steganographic and Cryptographic Systems", which is a continuation-in-part of International Application No. PCT/US00/06522, filed Mar. 14, 2000, which PCT application claimed priority to U.S. Provisional Application No. 60/125,990, filed Mar. 24, 1999, issued as U.S. Pat. No. 7,123,718; U.S. patent application Ser. No. 09/731,040, filed Dec. 7, 2000, entitled "Systems, Methods And Devices For Trusted Transactions", issued as U.S. Pat. No. 7,159,116; U.S. patent application Ser. No. 10/049,101, filed Feb. 8, 2002, entitled "A Secure Personal Content Server", which claims priority to International Application No. PCT/US00/21189, filed Aug. 4, 2000, which claims priority to U.S. Patent Application No. 60/147,134, filed Aug. 4, 1999, and to U.S. Patent Application No. 60/213,489, filed Jun. 23, 2000; U.S. patent application Ser. No. 09/657,181, filed Sep. 7, 2000, entitled "Method And Device For Monitoring And Analyzing Signals"; U.S. patent application Ser. No. 09/671,739, filed Sep. 29, 2000, entitled "Method And Device For Monitoring And Analyzing Signals"; U.S. patent application Ser. No. 09/956,262, filed Sep. 20, 2001, entitled "Improved Security Based on Subliminal and Supraliminal Channels For Data Objects", issued as U.S. Pat. No. 7,127,615; U.S. patent application Ser. No. 09/731,039, entitled "System and Method for Permitting Open Access to Data Objects and For Securing Data Within the Data Objects," filed Dec. 7, 2000, issued as U.S. Pat. No. 7,177,429; U.S. patent application Ser. No. 09/545,589, filed Apr. 7, 2000, entitled "Method and System for Digital Watermarking", issued as U.S. Pat. No. 7,007,166; U.S. patent application Ser. No. 08/999,766, filed Jul. 23, 1997, entitled "Steganographic Method and Device"; U.S. patent application Ser. No. 09/456,319, filed Dec. 8, 1999, entitled "Z-Transform Implementation of Digital Watermarks", issued as U.S. Pat. No. 6,853,726; U.S. patent application Ser. No. 08/674,726, filed Jul. 2, 1996, entitled "Exchange Mechanisms for Digital Information Packages with Bandwidth Securitization, Multichannel Digital Watermarks, and Key Management"; U.S. patent application Ser. No. 10/369,344, filed Feb. 18, 2003, entitled "Optimization Methods for the Insertion, Protection, and Detection of Digital Watermarks in Digitized Data", issued as U.S. Pat. No. 7,095,874; and U.S. patent application Ser. No. 09/789,711, filed Feb. 22, 2001, entitled "Optimization Methods for the Insertion, Protection and Detection of Digital Watermarks in Digital Data", issued as U.S. Pat. No. 7,107,451.

In addition, this application hereby incorporates by reference, as if fully stated herein, the disclosures of the following patents: U.S. Pat. No. 5,822,432, entitled "Method for Human Assisted Random Key Generation . . . "; U.S. Pat. No. 5,905,800, entitled "Method & System for Digital Watermarking"; U.S. Pat. No. 5,613,004, entitled "Steganographic Method and Device"; U.S. Pat. No. 5,687,236, entitled "Steganographic Method and Device"; U.S. Pat. No. 5,745,569, entitled "Method for Stega-Protection of Computer Code"; U.S. Pat. No. 6,078,664, entitled "Z-Transform Implementation of Digital Watermarks"; U.S. Pat. No. 5,428,606, entitled "Digital Commodities Exchange"; U.S. Pat. No. 5,889,868, entitled "Optimization Methods for the Insertion, Protection and Detection . . . "; U.S. Pat. No. 6,522,767, entitled "Optimization Methods for the Insertion, Protection and Detection . . . "; U.S. Pat. No. 5,539,735, entitled "Digital information Commodities Exchange"; and U.S. Pat. No. 6,205,249, entitled "Multiple Transform Utilization and Application for Secure Digital Watermarking". The following article is also incorporated herein by reference: "Bandwidth as Currency," IEEE Multimedia, January/March 2003 (Vol. 10, No. 1), by Scott Moskowitz.

BACKGROUND

A need exists for optimizing and provisioning the allocation of bandwidth. This is to assure better handling of the competitive needs between networks and the concept of Quality of Service ("QoS"), including determining the priority of available bandwidth in a given network. The prior art addresses priority of transmission paths for data in an attempt to alleviate bottlenecks within a given network. Caching technologies, as an example, seek to push higher demand data closer to the access points for which the data is demanded, so-called "edge traffic." A related approach, Quality of Service ("QoS"), attempts to make decisions about bandwidth accessibility based on a user's ability to access material within some predetermined time frame. For instance, if X number of users are able to access Y amount of bandwidth over some fixed period of time T, bandwidth can be estimated as a function of satisfying users X, or some percentage of X, for each increment of Y divided by T.

Users, however, may seek data objects note that the terms "data object", "data", "discrete analog waveform", or "data signal"—may be used interchangeably in this application) which by their very structure or format may occupy large amounts of bandwidth, thereby creating bandwidth demand that has little or no relationship to how the data is valued by third parties, including owners of the rights related to the objects. An example is the higher bandwidth demand and creation of network latency when streaming an audio or video signal, where, in addition, the data signal itself may be copyrighted. It is reasonable to assume that a copyrighted work does indeed have more value than one that is not copyrighted.

If a network can be used to handle any number of data files which can be aesthetic or not (for instance, functional data, such as algorithms, which itself manipulates data, would be considered to be non-aesthetic), and the value of the potential data may not be known in advance of provisioning for understanding how to handle bandwidth, this disclosure is designed to address some of the key factors in enabling a market for handling bandwidth and related transactions for data, which is made up of bandwidth in terms of how the data is rendered, manipulated, distributed and "potentially" priced given delivery and derivatives pricing to assist in the aggregate with delivery (particularly, commercial, so as to maximize the value of a network at any given point in time) of said objects. Another example is peer-to-peer network technologies that may tie-up bandwidth based on extensive database functions to bring two or more parties together seeking some data object without regard to the object's price or the underlying cost of maintaining peer-to-peer links to enable transfers of files between users. Additionally, the data object being demanded may not be readily determined to have ownership, authentication or responsibility necessary for successful commerce. This includes virtual private networks ("VPN") or demands made for security by senders, receivers, or combinations of both. Such clearinghouse features have been proposed by digital rights management ("DRM") providers but they lack the efficiencies and consumer demand which are required to handle data objects in a manner consistent with historical sales of a variety of data objects offered in physical formats. Systems such as Napster™, have been estimated to command as much as 4% of overall Internet bandwidth and yet no financial transactions exist to pay for either this extensive use of network bandwidth or any affiliated ownership and usage rights of the data being exchanged nor the historical value of said objects in other mediums such as physical objects containing the data (for example, copyrighted music files).

TCP, or Transmission Control Protocol, is currently used to break data into packets for transmission, which are received and reconstructed, sequentially at the receiver's end of the transmission. Technologies exist to assist with error correction when packets are dropped or lost during transmission, IP, or Internet Protocol, is designed to provide each networked "device" with an IP address. Packets sent under TCP and labeled with IP addresses enable data to be broken into packets and sent between machines that share TCP/IP coding schemes. In IP version 4 ("IPv4"), the current Internet Protocol, there are option fields that can be exploited at any place in the transmission chain for writing/embedding and detecting/recovering digital watermarks, a feature of embodiments in the present invention, for provisioning and pricing schemes, bandwidth prioritization, management systems, dispute resolution and clearinghouse functions. IPv4 allows up to 40 bytes of options; the size of IPv6 extension headers will only be constrained by the size of the IPv6 packet. Because of the sequential nature of TCP/IP a variety of optimizations have been suggested in the art. These include better ways of handling packets that may not have arrived at the intended address, or may have been lost during the transmission for any number of reasons (timing, error, overcapacity, rerouting, etc.).

One means for optimizing network speed is based on application of Reed-Solomon error correction coding. Because TCP/IP packets represent predetermined packets of data, that is, have a specific size without regard to the data object (e.g., its characteristics, perceptible or otherwise) being rendered, coarser estimates of the data objects' aesthetics or characteristics enable mathematical values to be assigned to a larger portion or subset of the data object itself. A simple linear equation can be used to define the independently derived values representing the data object. These mathematical values represent groupings of packets that are not sequentially ordered but fitted to the characteristics of the data object being broken down for transmission. These values can be handled by the systems or devices of the sender and receiver of the data to speed transmission or routing of the data. Using error correction coding, chunks are not sequential, as with TCP, but are generated with variations on Reed-Solomon code so that receivers of the data get chunks of the transmission that can be reconstructed non-sequentially but efficiently so long as the assigned values for the data are received. The chunks may also overlap the packets that would typically represent the object. In some applications, those signal features of the data which are deemed relatively, perceptibly important are reconstructed first on the receiving end of the transmission. This approach has the effect of speeding the routing of data over a network, such as the Internet.

IPv6 includes proposals for additional optimizations. In contrast with current IPv4 systems which are optimized to handled end-to-end transmission of data, without regard for the content of the data itself, attention has turned to enabling traffic prioritization, low level authentication with encryption, and better handling of audio and video streams. The present invention seeks to enable better granularity in handling data packets with a labeling scheme that can be handled by network infrastructures. Also essential is the authentication protocol to prevent labeling fraud. Specifically, the present invention offers a means for utilizing watermarks, in a manner that differs from traditional notions of digital watermarking (i.e., as information hiding in discrete objects), to prioritize data traffic and also to define the data being transmitted in terms consistent with any rights or ownership over the content being represented by the data. Provisions for clearinghouse facilities and certification of traffic are also contemplated by this document. Secondary or derivative markets for assisting in enabling efficiencies for the pricing of the bandwidth utilized are also, by extension, contemplated.

SUMMARY OF THE INVENTION

Disclosed herein is a method for transmitting a stream of data, which method comprises the steps of: receiving a stream of data; organizing the stream of data into a plurality of packets; generating a packet watermark associated with the stream of data; combining the packet watermark with each of the plurality of packets to form watermarked packets; and transmitting at least one of the watermarked packets across a network. The method may further comprise the steps of receiving at least one packet that has been transmitted across a network; analyzing at least one packet for a watermark and authenticating the at least one packet using at least a portion of the watermark; and in the event that the analysis authenticates the at least one packet, permitting the transmission of the at least one packet, and in the event that the analysis does not authenticate the at least one packet, generating a signal of non-authentication. In generating a packet watermark, the present invention may include the steps: generating a watermark packet key; associating a unique identifier with the watermark packet key; and generating a packet watermark comprising the unique identifier associated with the watermark packet key. The packet watermark may be placed in a header for each of the plurality of packets to form watermarked packets. Optionally, the packet watermark may include a unique identifier associated with the watermark packet key, and/or a hash output for a portion of the stream of data. Optionally, in the event that the analysis does not authenticate a packet, the invention may: i) halt the transmission of the data; ii) modify the data being transmitted so that the data is either degraded in quality and/or in quantity; iii) store a copy of the data being transmitted along with information that is indicative of a failure to authenticate occurred; and/or iv) delay the transmission.

Also disclosed herein is a system for transmitting a stream of data, comprising: a processor to receive a stream of data and to organize the stream of data into a plurality of packets; a generator to generate a packet watermark associated with the stream of data; a packager to combine the packet watermark with each of the plurality of packets to form watermarked packets; and a transmitter to transmit at least one of the watermarked packets across a network. The system may further comprise one or more routers, which router may include: a network receiver to receive a packet that has been transmitted across a network; and a network processor coupled to the network receiver for analyzing the packet for a watermark that can be used to authenticate the packet; whereby in the event that the analysis authenticates the packet, the router permits the transmission of the packet to continue, and in the event that the analysis does not authenticate the packet, the router generates a signal of non-authentication. The generator may include: a module to generate a watermark packet key; a module that associates a unique identifier with the watermark packet key; and a watermark generator to generate a packet watermark, which itself may include the unique identifier associated with the watermark packet key and/or a quality of service level associated with the data stream. Optionally, the generator may include a hashing module to generate a hash output for a portion of the stream of data, which hash output may be included in the packet watermark.

Also disclosed is a method for packaging data for transmission to a user, comprising the steps of: receiving content data that is desired by a user; organizing the content data into at least two packets; generating a packet watermark associated with at least one of the packets of data; generating a bandwidth rights certificate; and combining the bandwidth rights certificate, the packet watermark, and the at least one packet for transmission across a network comprising a plurality of routers. The bandwidth rights certificate may include: at least one cryptographic credential; and routing information selected from the group consisting of authorization data to authorize use of at least one particular router and priority data to prioritize use of at least one particular router.

Also disclosed is a computerized system for packaging data for transmission to a user, which system comprises: a receiver to receive content data; computer code to organize the data into at least two packets; computer code to generate a packet watermark associated with at least one of the packets of data; computer code to generate a bandwidth rights certificate; and computer code to combine the bandwidth rights certificate, the packet watermark, and the at least one packet, for transmission across a network comprising a plurality of routers. The bandwidth rights certificate may include: at least one cryptographic credential; and routing information selected from the group consisting of authorization data to authorize use of at least one particular router and priority data to prioritize use of at least one particular router. The bandwidth rights certificate may also include one or more of the following: a digital signature of a certificate owner; a unique identification code of a certificate owner; a certificate validity period; and pricing information for use of bandwidth. Optionally, the system may include a storage medium for storing bandwidth rights certificate and/or one or more packets of data. The system may be configured to operate on a hardware device selected from the group consisting of: a personal computer, a cable box, a telephone, a cellular telephone, a personal digital assistant, a personal music playback device, and a smart card.

Also disclosed is an electronic method for purchasing good and/or services, which comprises the steps of: establishing an account whereby a customer is credited with a predetermined amount of bandwidth usage; establishing a communication link with a vending system; selecting an item to be purchased; agreeing to a purchase value for the selected item; communicating to the vending system a request to purchase the selected item; and causing a debit to the account in an amount of bandwidth usage which corresponds to the agreed upon purchase value for the selected item. The communication link may utilize bandwidth on a given network, in which case the method may include the further step of causing a debit to the account in an amount of bandwidth usage which corresponds to the bandwidth usage associated with the time utilized in purchasing the item using the communication link. A debit may be in an amount of bandwidth usage which corresponds to an agreed upon transactional charge.

Also disclosed is an electronic method for selling good and/or services, and for collecting payments from a purchaser's account, which account has a predetermined amount of bandwidth usage. This method may include the steps of: establishing a communication link between a vending system and a purchasing system; receiving a request to purchase a selected item; determining a purchase value for the selected item; causing a debit to the purchaser's account in an amount of bandwidth usage which corresponds to the agreed upon purchase value for the selected item; and sending an instruction to deliver the selected item. This method may be useful when purchasing copies of digital data, when the method may be used to create a copy of digital data and to embed a record of the transaction into the copy of the digital data. When the communication link being established utilizes bandwidth on a given network, the method may include the step of causing a debit to the account in an amount of bandwidth usage which corresponds to the bandwidth usage associated with the time utilized in purchasing the item using the communication link. The debit may be made in an amount of bandwidth usage which corresponds to an agreed upon transactional charge. The method may also confirm that the debit to the account has been completed before sending an instruction to deliver the selected item.

Also disclosed is an exchange system for selling good and/or services, and for collecting payments from a purchaser's account, which account has a predetermined amount of bandwidth usage. The system may include: a communicator to establish a communication link between the exchange system and a purchasing system, whereby the two-way communication system can receive a request to purchase a selected item; a display for advertising, for sale, good and/or services; a transaction module for determining a purchase value for a selected item; a debit module for causing a debit to the purchaser's account in an amount of bandwidth usage that corresponds to the sum of: i) the purchase value for the selected item and ii) a transactional charge; and a delivery module for sending an instruction to deliver the selected item. The system may also include a dispenser to deliver the selected item. The system may also include an interface (for example, software and/or hardware) physically located on the exchange system to permit the selection for purchase of at least one items. The debit module may include a communication link with a third party system, whereby the debit module sends a request to debit the purchaser's account in an specified amount of bandwidth usage, and whereby the third party system causes the debit in the specified amount Finally, a system for the transmission of data is disclosed. This system may include: a receiver to receive content data; a processor to organize the content data into a plurality of packets; a watermark generator to generate at least a portion of a packet watermark associated with at least one packet of data; a certificate generator to generate a bandwidth rights certificate associated with at least one packet of data; and a transmitter to transmit at least one of the plurality of data packets, its associated watermark, and its associated bandwidth rights certificate across a network. The bandwidth rights certificate may include routing information selected from the group consisting of authorization data to authorize use of at least one particular router and priority data to prioritize use of at least one particular router. The system may also include a router to receive a transmission comprising a data packet, its associated watermark, and its associated bandwidth rights certificate, which router is configured to analyze the transmission and to check the authenticity of the transmission, and in the event that the analysis does not authenticate the transmission, the router generates a signal of non-authentication. In the event that the analysis does not authenticate the transmission, the router may take an action selected from the group consisting of: halting the transmission; delaying the transmission; and re-routing the transmission to a router for which the transmission is authenticated. The router may be configured to analyze and authenticate the transmission by checking a plurality of packet watermarks.

By means of associating a data object with a watermark, the present invention can analyze at the data that has been prepared for network delivery. Using the present invention, data can now be sent to a receiver in a manner which provisions bandwidth in an efficient manner (the novel embodiments described herein). When a single file is watermarked, it can be made as a unique copy. An advantage of the present invention is that it can create "postage for packets" (more articulately described as "bandwidth provisioning"). The present invention provides better granularity of what packets are demanded versus other packets. By means of associating identity and authenticating information of the packets, the present invention can more efficiently apportion bandwidth to meet market demands which are based on demand for information over networks and a better ability to identify the packets people are willing to pay for. The present invention also permits a better accounting system so that packets can be billed to the appropriate parties, and permits disputes to be more objectively resolved because the present invention can use cryptographic protocols that help to assure a higher level of confidence in how provisioning is being handled. Similarly, the present invention makes it possible to charge for bandwidth in a manner more closely similar to a traditional telephone billing system. The difference is that telephone billing systems do not take into account the contents or paths of packets, per se, nor do traditional telephone systems assist in creating a means for competitively evaluating bandwidth based on consumer demand for data which can be compared in media terms (type of media, rights, authenticity of the data, quality level of the media based on a differential price, etc.) not solely data size terms.

Using the present inventions, a network can check and verify efficient bandwidth delivery on a packet level and can store information concerning better paths between senders and receivers of these packets. The present inventions permit optimized "flows" so to speak. For certain economic or business models, further features may be added to make internet handling of data similar to how billing works for traditional telecommunications by phone companies. Such companies buy bandwidth resources in bulk by contract and do not have any underlying understanding of what the bandwidth is used for nor how to encourage higher value for any given bit for each bit per time calculation. There is no technology that does this either in the existing art Since the denominator, time, is fixed at any discrete moment, maximizing economic value for the numerator (the bit) given a market for information and goods and services that are informationally based, higher economic value can be attributed to a given network or networks which implement the features embodied herein. While no one can know in advance what the demand for a given data object—prior to being exposed to a marketplace of participants, parties can agree to the cost of bandwidth for a given business activity (streaming a live concert, handling bandwidth based transactions which are tied to a subscription with a bandwidth device such as a cell phone, choices between a streamed or copyable version of a data object, etc.). Streaming, to date, has never been made economically viable because, in part, vendors have not taken a packet level view of the flow of data to people demanding a stream. Nor have vendors tied payment or willingness to pay to the packets. This is where the present invention differs.

This document addresses three things to assist in getting this done: efficient provisioning of the packets on the network the creation of a so-called "packet watermark"; creation of bandwidth credentials "to enhance liquidity and derivative pricing provisioning for future estimated use of bandwidth"; and market mechanisms with cryptographic protocols to assist in billing and resolution disputes, both for the packets themselves, and as an extension application of traditional watermarking to the data objects as a whole to uniquely identify the object as with previous watermarking disclosures. Preferably, packet watermarked data does not interfere with traditional watermarks to establish responsibility for the objects being transacted, since the consumer has no care about what the packets are but may benefit if the consumer is able to observe which paths are best for getting information. Vendors selling information similarly would pay premiums for a better understanding of this granularity. This may be to avoid "double payments" of bandwidth where they handle the sending and receiving costs—instead of a path between a sender and receiver).

The present invention adds the novel layer of identity of the packets and subsequent provisioning by means of authenticating packets along a particular path ("flow") and perhaps using the best path as history about various paths are captured by a database used for such purposes. Heuristics may be applied as the system learns the best paths for packets so that future or subsequent use can be optimized. Taken to another level, the packets can be further analyzed based on what the data is, if such identification is also provided. Packet watermarks and data object watermarks are two methods, one micro and macro, in terms of the data's aesthetics or utility to the sender and receiver. While packets may be useless as packets, in the aggregate, data objects have value. This value is determined by a market place for information that can create receipts for the objects and also postage for the packets.

DETAILED DESCRIPTION

Packet Watermarking for Quality of Service Delivery

A watermark is a data object embedded inside a carrier that is used to authenticate the carrier without interfering with its normal usage. The classic historical example is a watermark in a bank note that authenticates the paper used for printing. More recently, digital watermarks have been developed to imperceptibly embed data in rich content objects to transmit all varieties of information. Digital watermarks can also be applied to functional data such as software or code by means of obfuscation of the actual functional code, license information, identity, or other uniqueness hidden in similar or nonfunctional code. Software watermarking is intended to assist in authenticating code in a manner more robust to the underlying functionality of the software than can be accomplished by simple digital signing of the code. Signing aesthetic or functional data at the inherent granularity of perception or function enables authentication of said data even after data compression or code optimization; but such watermarking can also be used to detect manipulations of the data at a subsequent time. The following applications and pending applications represent a variety of digital watermarking and steganographic ciphering applications, and are incorporated herein by reference: U.S. patent application Ser. No. 09/046,627, filed Mar. 24, 1998, entitled "Method for Combining Transfer Function with Predetermined Key Creation"; pending U.S. patent application Ser. No. 09/644,098, filed Aug. 23, 2000, entitled "Multiple Transform Utilization and Application for Secure Digital Watermarking"; pending U.S. patent application Ser. No. 09/767,733, filed Jan. 24, 2001, entitled "Multiple Transform Utilization and Application for Secure Digital Watermarking"; pending U.S. patent application Ser. No. 09/545,589, filed Apr. 7, 2000, entitled "Method and System for Digital Watermarking"; pending U.S. patent application Ser. No. 08/999,766, filed Jul. 23, 1997, entitled "Steganographic Method and Device"; pending U.S. patent application Ser. No. 09/456,319, filed Dec. 8, 1999, entitled "Z-Transform Implementation of Digital Watermarks"; and pending U.S. patent application Ser. No. 08/674,726, filed Jul. 2, 1996, entitled "Exchange Mechanisms for Digital Information Packages with Bandwidth Securitization, Multichannel Digital Watermarks, and Key Management." Other pending applications apply to a model for bandwidth optimization using digital watermarks: pending U.S. patent application Ser. No. 10/369,344, filed Feb. 18, 2003, entitled "Optimization Methods for the Insertion, Protection, and Detection of Digital Watermarks in Digitized Data"; and pending U.S. patent application Ser. No. 09/789,711, filed Feb. 22, 2001, entitled "Optimization Methods for the Insertion, Protection and Detection of Digital Watermarks in Digital Data", which applications are incorporated herein in their entireties. Less attention, however, has been paid to the concept of perceptible but non-interfering digital watermarks.

The Internet Protocol (IP) encapsulates all traffic inside packets. The previous description of IP applies here. A specific data object is broken into two or more packets, based on size. Each packet has a header that contains addresses, routes, and other identifying information. Many parties have addressed the security of packets, including such standards as IPSec. These protocols allow for encryption and authentication of packets and flows of packets, whereby the receiver can be assured of the secrecy and authenticity of each packet. However, these systems are all designed to create a secure interchange between compliant parties. What is missing is a system by which the sender can guarantee a particular Quality of Service (QoS) to a receiver without entering into a cryptographic exchange with the receiver, using the existing and proposed Internet protocols without modification. This invention covers a novel combination of watermarking techniques with Internet Protocols to create such a system.

When a receiver requests a data object from a sender, the sender creates a packet flow with the receiver's address and sends it out into the Internet. The packets may make many hops before arriving at the receiver's IP address. At each node, a router examines the address and chooses a route to the next node. Often there are many possible routes from each node to the final destination. These routes may be ranked by a number of criteria, including current load, historical load, historical reliability, current latency, and historical latency. All of these factors could be used to route individual packets by more or less optimal paths—assuming that the router could discriminate between different flows. The packet watermark becomes the method by which the router identifies streams and creates differential QoS.

Simply labeling a packet as express, regular, or slow delivery is insufficient. There is no way to enforce compliance with the label. Quickly, everyone would be marking their packets "express" and there would no longer be differentiation. This is an example of the "free-loader" problem. A "packet watermark," on the other hand, is cryptographically associated with the contents of the packet itself. For example, a traditional digital watermark may be dependent on signal characteristics of the signal being watermarked. If a key-based system is used for watermarking, a cryptographic association between the key and the signal via the watermark may be created. Besides the noise or signal characteristics in the signal itself, the key may be seeded by independent random information to make it more difficult to guess (meaning randomness independent form the signal to be watermarked to make guessing the key more computationally difficult—if a watermark is based solely on the signal and its inherent noise, finding the needle in the haystack is simply a searching problem, not a computationally difficult problem), even if the watermark is found in the signal. Key-based watermarks are used to authenticate or verify a data signal to establish responsibility for said signal or alert users of unauthorized data signal copies. Unauthorized use of a particular routing priority could be detected by a packet sniffer, which sampled a fraction of the overall traffic to detect, and deter, abuse of the system. The sniffer reads the watermark on the packet, checks the authentication, and signals invalid packets. The flow can then be rerouted, delayed or halted, depending upon the terms of the commercial contract. Additional embodiments of the present invention can assist in enabling a workable exchange that may further alert participants of the exchange of particular users or unauthorized parties. This can assist in preventing Denial of Service ("DoS") attacks and similar misuse of network traffic. Conversely, the exchange may maintain histories of the effectiveness of particular routes or particular parties that may command a premium price or similar consideration for the "recognition" or "reputation" a party has attained.

Some form of recognition or identification of data streams may be handled by firewalls, intrusion detection systems and similar analysis to assure data integrity. These common techniques rely on comparisons with prior history of the data stream or data associated with it and may include heuristic or Bayesian methods for optimizing inherently comparative approaches. The present invention contemplates potential optimizations in authentication or verification of data streams and their associated packet watermark[s] by determinations of any or combinations there of the following: Ethernet IDs, port IDs, URLs, DNS addresses, IP addresses, related data streams, related packet flows, XML or meta-data associated with the data streams or data objects, intrusion detection techniques, virus detection techniques, and a logical context of the packets' origin or destination. To this extent, the present invention may integrate data integrity checks along with its data authentication functions.

Sample Embodiment

In one embodiment of the present invention, the packet watermark may be used to classify a stream of data for a particular QoS. In particular, the stream of data may be organized into a plurality of packets, and the sender may add a watermark to the header of each packet comprising the stream. The size of the watermark may vary, but for illustration, a 32-bit watermark is used. Preferably, the same 32-bit watermark may be placed in each and every packet in the flow. In a particular case of TCP/IPv4, the 32-bit watermark may be stored in the Stream ID option field (i.e., in the header) in the IPv4 packets. To indicate a QoS level for the flow, a portion of the watermark may be reserved for a QoS level identifier. For example, in the example of a 32-bit watermark, the 4 MSB's ("most significant bits") of the watermark could be used to identify the QoS level, yielding 16 available levels, and the remaining 28 bits of the watermark could be used to uniquely identify the flow.

The 32-bit watermark, or a portion thereof, may act as an identifier. No particular format is required for the watermark, and accordingly almost any format may be used. In the example illustrated, the 4 MSBs are used for the QoS level, and the remaining 28 bits can be used to store a unique identifier. One possible use for the remaining 28 bits is to store a unique identifier that is associated with a watermark packet key—which key can be used to help authenticate the data flows.

For example, the slender may create an array of SHA-1 hashes (or any hashing protocol deemed secure by the party or parties mutually) of the flow using a 4096 bit random sequence (the 4096 bit random sequence is referred to as the "Watermark Packet Key"). More particularly, the input to a hash function is comprised of three things: the Watermark Packet Key (in this case, 4096 bits), the Watermark (in this case, 32 bits), and a portion of the flow (for example, that portion of the flow that will be placed in a given packet). It is anticipated that the portion of the flow to be used as input to the hash function may comprise that the flow associated with one, two or even more data packets, but for purposes of illustration, the flow associated with one packet is used (i.e., the portion of the flow that will be inserted into one TCP/IPv4 packet). The output of the hash may have a predetermined number of bytes (usually as pre-determined by the hash function—for example, 20 for SHA-1). The array is the set of all of the hash outputs generated using successively portions of the flow until the complete flow has been processed. The outputs of the hash, the Watermark Packet Key, and the 32-bit watermark are combined to create the Watermark Identification ("WID").

Accordingly, the watermark can be matched to a corresponding WID (by comparing the watermark in a packet with the watermark in a WID to see if they have the same unique identifier associated with a given watermark key). The component parts of the WID may then be used to check the authenticity of the flow. For example, the watermark key from the WID can be used with the data flow from the data packet to create a hash output, which can then be compared with the corresponding, previously generated hash output stored in the WID. If the newly generated hash output matches the previously generated has output, then the data is considered to be authenticated. Moreover, if a portion of the watermark is used to identify a particular QoS level, then the data can be evaluated for compliance for a particular path (such, as for transmission by a compliant router).

In this illustrated embodiment, 4 MSBs of the watermark have been used to identify a QoS level. This is simply a suggested format. Any predetermined bits 4, more than 4, less than 4, whether MSBs or LSBs or even nonadjacent bits) may be used. It is preferable, however, that the same watermark be used within each packet of the stream. It is also contemplated that the watermark may contain no QoS indicator, in which case, all of the bits allocated for the watermark may be used for a unique identifier such as that associated with a particular watermark packet key.

The WID holds all of the dependent data. There is only one 32-bit watermark assigned for each stream, and one WID created. The Watermark Packet Key may be reused. So the WID may look like this:

4 bytes (32 bit watermark, inclusive of any QoS indicator)
512 bytes (4096 bit Watermark Packet Key)
20 bytes (hash output from the first block of the flow of data steam)
20 bytes (hash output from the second block of the flow)
20 bytes (hash output from the third block of the flow)
. . .
20 bytes (hash output from the last block of the flow)

The size of the blocks used for hash input may be determined by the ratio described below.

Each router along the path of the flow can read the watermark and determine its QoS by using those bits associated with the QoS indicator (in this case, the 4 MSB's of the watermark). Each router can then take appropriate action for prioritizing or deprioritizing each packet. These actions might include: choosing a path based on load, reliability, or latency, or buffering lower priority packets for later delivery.

The router may be configured to check the authenticity of each packet. Preferably, a router may be configured to check a subset of the packets for authenticity (thereby, reducing overhead computational requirements). For example, copies of a predetermined, small percentage of watermarked packets may be diverted to a sniffer. Preferably, the sniffer has received the WID's for all authorized flows either before receiving the flows or in a time frame that is contemporaneous. The sniffer compares the watermark of the copied packet to its WID table to find the appropriate WID. If a corresponding watermarking key is not identified, the packets are deemed unauthorized and the router is instructed to deprioritize, or, preferably, to block the flow of inauthentic data. If a corresponding WID is found, the sniffer calculates a hash output (for example, using the SHA-1 hash of this example) for the packet and attempts to match it to the corresponding hash in the WID. If the hash values match, then the router permits the flow to continue on its path. If the hash values do not match, the packets are deemed un-authenticated, and the router is notified.

Preferably, the watermark generator software is responsible for maintaining a specific list of sniffers that are to receive the WID. For each one of these, the WID is preferably sent encrypted and signed, using a public key technology, such as PKIX certificates or Open PGP keys. It is envisioned that the watermark generator will be responsible for delivering the WID to trading partners who have established a prior business arrangement, and the WID will be passed along to additional devices by the trading partners, thus eliminating scaling problems at the sender. These may comprise, moreover, functions handled by the exchange and clearinghouse features of the present invention, disclosed below.

It is contemplated that the present invention may permit control over a ratio of the sizes of the original data to the size of the WID made from that data. A typical ratio might be 100:1, which means that every 100 bytes of original data create 1 byte of hash. Generally, it is desirable for a sniffer to collect 2× the original number of bytes to guarantee enough data to calculate a hash, given that the sniffer does not know a priori what the original size of the number of bytes. For very large flows, 100:1 may create unacceptable large WID's. The ratio can be set to any value. As the ratio decreases, the WID delivery channel needs to get larger. As the ratio increases, the amount of original content necessary to the sniffer increases, as does the amount of the flow that can pass before an authorization check can be completed. By making the ratio sensitive to data type and size, the system can be dynamically optimized to meet the needs of the market, To more fully extend the benefits of this embodiment we generalize additional novel features absent in the art concerning, management, pricing mechanisms, clearinghouse and dispute resolution methods and systems.

Exchange and Provisioning for Bandwidth Optimizations

Defining the Value of Bandwidth Rights

It is an object of the present invention to create methods for allocating bandwidth resources. One approach is to break the bandwidth into discrete, usable component pieces, and enable an electronic market system to set a price for the commodity ("the bandwidth") setting an equilibrium level of supply and demand. The net effect of this approach, and its anticipated trading system, will be to efficiently apportion bandwidth to users who wish to download or upload value-added information, in whatever form it takes (including value-adding components, or VACs—disclosed in TRUSTED TRANSACTIONS—). This includes efforts to broadcast or stream data as well. Bandwidth affects the speed of information transfer. Bandwidth is defined as bits per second. If more bandwidth is used, speed increases, and the transfer is accomplished in less time. A need exists in the art for deciding which bits should be prioritized versus the fixed amount of time available to route or transmit the bits. Valuing bits in a bandwidth context is similar to quantizing risk in other commodities' transactions.

Mathematical techniques exist which are applied to financial instruments to break risk down into discrete components to better predict or forecast financial decisions. Better measures of risk assist in making better decisions concerning the allocation of resources. Allocation of bandwidth resources is another increasingly important financial decision in an information economy. These may include investment decisions or insurance decisions. Investment decisions regard the choice to allocate financial resources in a manner to optimize the return on the investment. Insurance is designed to use actuarial estimates of a given data object or commodities' history and condition to estimate a cost for covering the potential loss or damage of the data object. Because it is difficult to predict what data object (thus, bandwidth) will be demanded and thus how to assist in estimating the potential economic value of such demand for a given network, pricing models need to be used to assist in quantizing risk, exchange mechanisms are required to facilitate trades, and cryptographic protocol applied to assure confidence in the provisioning of bandwidth.

Focus has been made on options pricing models, such as the well-known Black-Scholes option pricing mechanism, and variations which exist to better estimate and quantize risk for a commodity that is being optioned (so-called "derivatives"). Given the imprecise nature of bandwidth allocation, without regard to decisions concerning the supply and demand of said bandwidth, the present invention introduces a number of improvements to the handling of data (e.g., provisioning) and by extension the bandwidth used to represent said data. Some of the mathematical techniques for pricing models, including Black Scholes, will be outlined below. These techniques can be used to facilitate better pricing in addition to the increased efficiencies evident with bandwidth provisioning using packet watermarking described above (applied to packets and in some cases additionally the data object—a micro and macro approach). Bandwidth is a commodity and by extension a potential form of currency that is better priced with financial tools such as options and other derivatives. Being able to communicate only that which people are willing to pay for, requires integration of identification and authentication of bandwidth between parties.

Black-Scholes is easily represented by the following properties, which can be further generalized mathematically. The standard deviation of the asset's value (that which is optioned) multiplied by the square root of the time of the option's expiration. Essentially a ratio of the asset value to the present value of the option's strike price. The strike price is the price at which the option is being offered and later exercised.

Simply:

First) Standard deviation of the asset's value multiplied by the time of the expiration the option=

Second) The underlying asset value/the present value of the option's exercise price option exercise price/(interest rate) superscript time of the option To purchase or to sell is the difference in the right of the option that is called a "call" or a "put" (the right but not obligation to "sell", a call is the right to "buy", the underlying asset covered by the option).

More generally, the Black-Scholes equation is as follows:

$$C_0 = S_0 N(d_1) - X e^{-rT} N(d_2)$$

Where $S_0$=the price of the underlying asset (a predetermined value)

$N(d_1)$=the cumulative normal probability of unit normal variable $d_1$ $N(d_2)$=the cumulative normal probability of unit normal variable $d_2$ X=the exercise price T=the time to expiration or maturity of the option $r_f$=the risk free rate (a value which can be predetermined at the time of pricing the option)

e=the base of natural logarithms, constant=2.7128 . . .

$$d_1=[(\ln(S/X)+r_{fT})/(\sigma\sqrt{T})]+[1/(2\sigma\sqrt{T})]$$

$$d_2=d_1-\sigma\sqrt{T}$$

Helpfully, by isomorphic relationships we can extend the Black Scholes model to discrete mathematics which, as is known in the art, is able to handle continuous time and proof of the limit of options pricing. The present invention sets a limit for how much we can know in estimating the price of the option given both objective (that which can be predetermined) and subjective (that which like "indeterminable" or "unpredictable" risk cannot be predetermined) data elements. Making Black Scholes discrete also enables the present invention to describe more concretely aspects of optimizing bandwidth as an asset for which risk exists in how it should be allocated or used.

If an individual instance of the present invention's proposed instrument is a bandwidth right (as well, by extension an "option" which is the right but not obligation to purchase the underlying covered commodity within some predetermined period of time: in this case bandwidth), it can be observed that several factors will affect its value, including the following:

Intrinsic Value

This value is measured versus a minimal standard telecommunications cost. Telecommunications infrastructure has obvious relationships with the potential cost of carrying or allocating bandwidth. Intrinsic value may differ between providers, geographic location, wired or wireless connections, and countries. To the extent there exist such differences in pricing, elements of the present invention can create cost equivalencies based on such observable differences and identify the difference in cost. If there is a single underlying telecommunications cost to the owner of the right of X dollars per time, let $min_0$ represent the amount of time it takes to download the information using the minimal bandwidth, and $min_1$ represent the amount of time to transfer the information at the bandwidth represented by this right. Note that $$min_0 \geq min_1$$

Then the intrinsic value $V_1=X\times(min_0-min_1)$, or the amount of money saved in telecommunications costs at the higher bandwidth. The intrinsic value can be negative, which would imply a compensating premium placed on the time saved by using the more expensive transport.

Percentage Chance of Failure

This probability recognizes the generally unreliable nature of telecommunications and transmission mediums as well as underlying computer systems. There are basic and more advanced methods for estimating the so-called Quality of Service ("QoS") of a given network which, as previously disclosed, estimates a raw measure of the percentage of bandwidth being offered to some number of users connected to network in question in capacity terms. To equate QoS with historical peer-to-peer, or end-to-end, handling of bandwidth, features of the present invention are directed. Rather than be burdened with the task of solving all of the "bugs" in a given piece of commercial software, or network, it would be better to account for failure in the valuation. This value could be adjusted over time, as the failure probability of a system becomes more apparent, or changes. Some actuarial measurement can be made as experience with the envisioned system is realized. Additionally, heuristic measures may be logged or stored to identify specific points of failures or inefficiencies to be addressed. Reputations or recognition for particular users or providers can assist in decisions made by other market participants. In short, "percentage chance of failure" represents the percentage chance a user cannot exercise its right or option (where the option is the right but not obligation to purchase an underlying asset) for bandwidth. It affects the expected value of the right. In this baseline approach, if the probability of failure is $P_f$, where $0 \leq P_f \leq 1$, and the value of the right is $V_0$, in the absence of failure, then:

$$V_f=(1-P_f)V_0.$$

Convenience Premium

This represents some premium, $V_C$, that a person is willing to pay to transfer their information within a specified period of time (i.e. "now" or "in the next 10 minutes"). The cost to the network to achieving the demand of individual users may require predetermined estimates of how much bandwidth can be re-allocated to a user in demand or may be dynamically adjusted by factoring in some excess bandwidth to serve as liquidity for estimates of potential demand. For instance, highly sought after data objects or data streams may cause higher demands for bandwidth in real time or may be reserved by exercising the right before its expiration. An exchange itself may wish to pay for the rights to provide additional needed liquidity to satisfy forecasted demand. The potential for increases in transparency by applying bandwidth provisioning, described herein, and cryptographic protocols for identification, authentication and verification, described in more detail below, make possible better mathematical estimates of the potential value of the convenience premium to all market participants.

Alternatively, the network may have higher demand which is consistent with more predictable peak periods of time of use by consumers, for instance between 4 pm and 7 pm on weekdays for consumer back from work or school. These rules can be used to filter and achieve better estimates of how bandwidth should be allocated. The rules may apply to: 1) particular or uniquely identifiable data objects 2) whether the data object is to be streamed 3) date or time schedules 4) geographic locations of either the provider or user 5) the hardware or software which underlies the network for which the bandwidth is being sought 6) other unique circumstances including live performances. Moreover, identification of the parties involved in a particular transmission may itself act as a contributing factor to increases in the value of the convenience premium: a form of recognition or reputation. The premium is also likely to come out as the market sets the price for a right. If there is a formula for what the price should be, then the premium is simply the difference between the result of that formula, and the actual market price. This really measures the balance between supply and demand. The more demand in excess of supply, the higher C will rise. $V_C$ is then a function of supply and demand.

$$V_{real}=V_{theoretical}+V_C$$

Time Value

This is a function of the exercise period of a bandwidth right. It is proportional to $P_f$, since more time allows for recovery from an individual failure to transfer. There are two components of time, over what period a transfer can be initiated and for how long the transfer can last once it is initiated. Note that this is made more complex by congestion factors. For instance, if a user has a right for 10,000 kbps for 10 seconds, and the user wants to transfer 100,000 kb, it is not likely that the transfer can be done in exactly 10 seconds. Protocol overhead and congestion will add some increment of time. It is advisable to leave room in the exercise period for these factors, rather than trying to value the time value in some manner that accounts for these transient conditions.

Features of the present invention provision for additional data and time overhead to handle congestion with market-based features. Additionally by utilizing the features previously disclosed concerning bandwidth packet watermarking, time value can be more highly granular and identifiable. Certainly, optimizing the flow of bandwidth while creating accounting and clearinghouse mechanisms for handling existing and speculative demand for bandwidth resources is a novel and beneficial feature over the prior art.

Thus:

$$V=(1-P_f)(V_r+V_T-V_C)=(1-P_f)[(X(\min_0-\min_1))+V_T+V_C)]$$

The convenience premium, $V_C$, should be independent of all other values (except V). The equation behaves as follows: With increased failure probability decreasing bandwidth rights value, independent of other variables, while increased demand relative to supply would drive up $V_C$. We might try to compute $V_C$ by accounting for known demand and supply values, and in fact, it is of vital importance to know the supply, and to allocate it so that any right issued can be exercised within its exercise period.

Clearinghouse Functions

Additionally, it is observed that a method and system is needed to allocate supply based on demand that accounts for unused rights. This may be separate or complementary to the packet watermarking features previously disclosed or may be considered an additional feature to assure that bandwidth provisioning is properly accounted for. In other words, the system needs to over-allocate supply to some degree, knowing that some rights may go unexercised, so that demand is filled as much as possible. This is similar to airlines' practice of overbooking flights. It is also necessary in providing liquidity to the market and assuring that bandwidth is effectively allocated in a timely and efficient manner. Some mechanism must be in place to prevent attacks on the system, by a party, who, in effect, tries to corner the market in bandwidth, with no intention of using it, so that it goes unused. By extension, Denial of Service attacks are related o this unwanted occurrence. Naively, one would think that since one has to pay for the bandwidth, why would someone want to corner the market? Although bandwidth is not "free", it should only comprise a small fraction of the value of the information to be transferred, and so this is not an unthinkable situation. Similarly, the accounting of the bandwidth used should not exceed the value of bandwidth provided. An accountant cannot charge more than the value being accounted, the economics cannot justify the cost. By breaking down the path of packets as well as provisioning for pricing based on supply and demand, features of the present invention address accountability in a transparent manner.

As well, ISPs and other providers of information must be able to engage in competitive bidding, or arbitrage, for the cost of the bandwidth they purchase and better map these purchases with demand patterns of their users or demands being made by other vendors who currently engage in sharing bandwidth resources to enable a freer flow of information across public networks. The likeliest preventive measure is the existence of competition in transmission. Additionally the methods and system contemplated herein include provisions for clearinghouse facilities and accountability handled by trusted third parties. Transactions for the rights, options and the actual trading of bandwidth can include secure time stamps, digital signatures, digital certificates, and other cryptographic protocols to enable independent third party verification and accountability. These features can be offered in real time or may be saved in separate, secure storage facilities for assisting in settlements. Where two parties may have competitive interests in any given transaction contemplated herein, secure, cryptographic credentials (such as, digital signature, secure digital watermarks, digital certificates, and the like) have obvious value to enhancing the success of an efficient bandwidth exchange. These issues are disclosed below.

Secondary Markets

Another option is the potential need to necessitate a secondary market for the trading of bandwidth, which could be divided up by a trading syndicate, and traded on a secondary basis to users. In a manner of operations, telecommunications companies perform this role between national telecommunications systems to facilitate international phone usage. But the difference with the system envisioned in the present system is that "any" user could buy bandwidth rights at times of low demand, and hope to sell them at a profit in times of higher demand. This would seem to imply the exchange itself should do some proprietary trading in this manner, both to profit, and to ensure some bandwidth is available for sale to users when they need it. This will have a purpose to serve in making the market efficient in the future. The present invention anticipates such facilities which can be created and handled by parties with an interest in the efficiencies and potential profit opportunities afforded to maximizing the value of bits being handled by any given network, or networks. Time being typically fixed for users, value of the data objects being offered being subjective, features of the present invention offer robust handling of supply and demand of bandwidth.

Bandwidth rights instruments are likely to be highly localized to specific subnets, domains, internet service providers ("ISPs", portals, wireless networks, etc). Especially since certain types of connections may be available only from certain exchanges, and since failure probabilities are likely to vary with specific hardware, operating systems, and service providers (including ISPs). Additionally, the basic valuation equations above do not address telecommunications costs across various types of lines. This problem at least, can be solved by active maintenance of cost tables, designation codes for types of lines, and the designation of a low cost standard: a minimal intrinsic value to bandwidth is an example of a minimum cost. Secondary markets for the cash or cash equivalent value of bandwidth given the limitations of a particular means for bandwidth exchanges, including POTs, DSL, cable, fiber, wireless, etc., is enabled by features of the present invention given the link between supply and demand, additions of rights and options for time value, and the cost of bandwidth for objects being exchanged or streamed, in satisfying demand.

Bandwidth as "Currency" Between Exchanges

The problem of moving rights between exchanges can be difficult since supply/demand planning for one exchange will not translate to another, unless some means for interconnecting exchanges is developed, and exchange bandwidth planning is global. The race by many parties to link users to the Internet via varying access links (modem) including DSL, POTs, cable, fiber, wireless, satellite may further the need for common bandwidth pricing, in fact, improved handling of bandwidth is a result of the success of TCP/IP and the vendors who have integrated much of the public Internet as well as gateways to virtual private networks ("VPNs"). What is clear is that the basic structure of the present invention would facilitate such planning to the benefit of all market participants: telecommunications providers, ISPs, users and publishers as well as more general aggregators of content and bandwidth such as, phone companies, cable companies, personal digital assistant manufacturers, personal music device manufacturers, and satellite companies intending on providing services across multifarious line types.

Accountability and Cryptographic Credentials

By securitizing bandwidth rights, the creation and supply of bandwidth rights digital certificates, made unique by cryptographic methods to manage them, will also be necessary. Transferring traditional digital certificates between individuals is complicated and unnecessary without tying such cryptographic credentials into the functions of the exchange. The three main categories are: advertisement or publicly available information concerning the bandwidth rights certificates, facilities for handling the identities and financial credentials of the market of buyers and sellers, and a facility for completing or settling transactions. Independent oversight concerning disputes resolution are anticipated and benefit from the level of cryptographic protocol utilized in the present invention. Following the general principles of a securities clearing model is highly applicable. In this case, the exchange needs to create and manage an account for each party that can own or trade bandwidth rights. Additionally, a method for authenticating said party or parties is required. Use of public key infrastructure, including digital credentials such as certificates, as well as adding the additional feature of embedding these credentials into data being traded by means of a steganographic cipher or digital watermark, are clearly absent in the prior art.

Additional facilities for accountability may include digital signatures (including such variants as one time signatures, zero-knowledge proof signatures, etc.). Separating recognition or general search facilities, i.e. market data in which participants decide to enter into transactions, from transactional, audit-type facilities have the likely impact of improving the handling of noncommercial and commercial activities for the network as it balances bandwidth needs. Additionally, as all the data being handled for exchange function and fulfillment can be measured in terms of bandwidth, the present invention serves as a basis for increasing the likelihood of enabling bandwidth to act as currency for information data, as well as optimizing the economic use of telecommunications networks. With these elements, a trading market system can be implemented by the following methods:

The EXCHANGE creates and manages a supply of uniquely distinguished bandwidth rights certificates. These certificates are good for a specific period only. They may traded over the course of time, anywhere from the moment they are created to the expiration time. It is questionable whether a right should be exercisable once it is clear that even if a transfer is initiated, it cannot be completed given that right only. However, consider that the right is usable, but its value decreases rapidly as it approaches expiration (i.e. value is based on time left, not total transfer time). Once a certificate is expired it is deleted. Inclusion of more traditional notions of options, as previously disclosed would greatly assist in measuring and quantifying risk associated with bandwidth rights certificates. Hash values incorporating a time-stamp could be used to serialize certificates. Such a cryptographic method is well noted in the art. U.S. Pat. Nos. 5,136,646 and 5,136,647 ("Digital Document Time-Stamping With Catenate Certificate" and "Method For Secure Time-Stamping Of Digital Documents" respectively) describe methods for cryptographic time stamping. Besides "universal time," used for secure time stamps, other methods for data uniqueness include digital signatures or one-way hash functions alone. These elements may include information relating to an independent, third party, the exchange where the transaction takes place, an agent or principal to a transaction, a certification authority, or some subset of the data may be handled anonymously to assure levels of anonymity which may be required in assuring higher efficiencies in handling and settling trades for bandwidth rights certificates and the associated bandwidth.

One way would be to extend the attributes of a traditional digital certificate by incorporating the present inventions novel features of how bandwidth is to be provisioned, as previously disclosed in connection with packet watermarking or faster routing processes including application of Reed Solomon or other error correction codes to network data handling, and any mechanism which can be adjusted to reflect the real-time or future price of the bandwidth certificate. If the available price is immediately based on some impending expiration of the validity period of the bandwidth right itself, OR the validity of the bandwidth rights cryptographic certificate, if the actual period of time the cryptographic attributes saved in the digital certificate is close to expiration, this value may become infinitesimal as expiration occurs. For instance an X.509 digital certificate contains the following elements:

1) Version of X.509 2) serial number of the certificate 3) the certificate holder's public key 4) the certificate holder's unique ID 5) the certificate validity period 6) The unique name of the certificate issuer 7) the digital signature of the issuer and 8) the identity of the signature algorithm.

Fields for 1) handling the bandwidth to be transacted, as per the previous discussion on how to route bandwidth packets (including the previously discussed Reed Solomon variation on transmitting packets in chunks to speed overall transmission); 2) a field for a pricing scheme; and 3) a field for additional information to assist with the pricing scheme, such as a Black Scholes options field, could be supported to handle particular embodiments of the present invention. In some cases, the certificate may not require all of the elements as they pertain to bandwidth trading and could include, at the very least:

1) The digital signature of the certificate owner (this might include the unique information relating to the exchange or hub for which the certificate is being considered for trade, especially if pricing differs amongst a plurality of similar exchanges) 2) unique ID of the certificate holder (including, for instance, a buyer, seller, or agent, and any unique information ID for which the certificate holder is committing the certificate to any of a plurality of exchanges) 3) the certificate validity period (for the present invention, this would apply to either the validity of the cryptographics employed in the certificate or the period in which the price or price equivalent value, for instance an buy or sell option or futures price, is valid) 4) the identity of the cryptographic algorithm[s] which is used by the certificate owner. 5) the identity of the pricing mechanism used (including provisions for Black-Scholes or similar options pricing models, futures, or other similar mechanisms)

Additionally, use restrictions or rules associated with the bandwidth being contracted for/to can be added as additional fields. These might include predetermined agreements which assist in defining the application of the bandwidth right to an applicable market or markets. There may also be provisions for including functional data, software or executable computer code, or algorithms, to the bandwidth right cryptographic certificate to reduce computational overhead at the sender or receiver end of a transmission.

The exchange creates a central hub, or plurality of hubs, for planning bandwidth supply, accounting, and disseminating pricing information. This hub may take the form of a syndication or plurality of similarly suited exchanges or there may be exchange rate features to account for differences between telecommunications costs in a given locality or geographic location (such as a country, city or states). Differences may exist between exchanges in the types of cryptographic protocols which are used by the exchange, as well. Alternatively, the differences between how pricing information is disseminated between various exchanges will relate specifically to the cost of the telecommunications (i.e., "intrinsic value") based on the form of deployment (POTS versus cable) or spectrum being handled (wireless 900 MHz versus 3 G). In some cases, spectrum allocation may suffer from other market pressures in pricing including government control or some other similar restriction for how the bandwidth may be allocated or used. Client-side software will value the rights relative to a particular user's needs, and used by any party trading rights. A seller creates a SELL advertisement, which is entered into the "exchange." The exchange verifies the seller actually holds the right in their account.

The exchange may further maintain records regarding the reputations of the market of SELLERS and BUYERS who have traded on the exchange. Additionally, embodiments of the present invention may separate the trading facility from the facilities for advertising BUY and SELL orders. A buyer then enters a BUY offer against the sell advertisement. The exchange validates the buyers and sellers, and then clears the transaction, transferring money from the buyer's payment method or credentials (credit card, micropayment, payment facility, credit terms, etc.) to the sellers account, and the right to the buyer's account. The unbundled right may be so infinitesimal that the actual cost of the right must be bundled with the underlying content or information being sought. The rights could also be bound to underlying titles (by an associated hash or digital signature or an embedded digital watermark). Essentially the relative cost of the bandwidth right represents some small amount of bandwidth, satisfactory in serving as a cryptographic or trusted piece of information, which is factored into various classes of trades so that higher computational efficiencies can be maintained. As certain bandwidth certificate attributes are used more frequently, perhaps, than others who are buyers or sellers or both, of bandwidth rights, smaller more compact amounts of bandwidth will likely be result as improvements and experience dictate. This may be similar to attaching sales taxes, handling charges, and credit card use charges that are typically bundled with the cost of a given physical goods purchase. The underlying telecommunications cost (i.e., "intrinsic value"), the underlying computational cost of the bandwidth certificate and its attributes, as well as additional information overhead for accounting and clearing trades, would represent the cost floor in computational cost, bandwidth, and time for embodiments contemplated herein.

When bandwidth is actually traded some link between the original trade for the bandwidth being supplied may be hashed or signed and used as a transaction receipt for the data that is later sent using the transacted bandwidth. This data can alternatively serve as a record of trades for dispute resolution or accounting to keep all participants informed. Once the actual transacted bandwidth is used by an end user, embedding bandwidth rights, bandwidth certificates, transaction-related unique information (for instance, hashes, signatures, times stamps, etc.) with digital watermarking technology has the further benefit of keeping the file size of the bandwidth once it is used in the form of a data object being exchanged or streamed. It is clearly an option with benefits for embodiments of the present invention. Again, a separate certification authority or government-agency may ultimately serve as the arbiter of trust in enabling economic, transparent and liquid markets for bandwidth use.

Sample Embodiment

User A has a cellular phone and a personal digital assistant ("PDA"). He pays a fixed rate of $100 per month for 1000 minutes of cellular air time (which equates to $0.00167 per second). There are times at which this rate may be higher or lower or locations for which charges may be assessed when the use utilizes either device in some geographic location outside of, for instance, the location where the devices were registered for use. The user alternatively pays $200 per month for 1000 minutes for PDA connectivity (which equates to $0.00333 per second), which may include e-mail functions, image or audio file downloads or streams, and any other functionality commonly attributable to a general computing device such as a PC. The PDA may also place a cost structure on where the device is used in relation to its registration location and may charge for the amount of data which is uploaded, downloaded or exchanged. This may be measured in bandwidth terms (such as a charge per some amount of bytes or bits). The functionality being different for each device, an arbitrage opportunity exists if the user can trade his cellular phone minutes for PDA minutes. The benefits in this example are a 2:1 ratio of expense.

User A may want to use either of the devices in the example to make some purchase of a good or service which can be handled by the device itself. The security for the transaction must have been previously agreed to by the vendor providing the goods and the provider of the device for which embodiments of the present invention can be used to facilitate a commercial transaction. For instance, a vending machine which can handle transmissions from either of the two devices to enable a transaction for a can of soda or a weather forecast, or some other valued consideration, is a device with which the present invention has applicability. The user has bandwidth rights which may be separate from the minutes that have been paid for solely for the functions of the respective device. The user may use a valid or existing bandwidth rights certificate to represent a payment facility for which the cellular or PDA bandwidth provider can monitor and account. If the transaction can be handled with the vending machine, for instance a wireless exchange of credentials between the vending machine and user's device, value has been attributed to the use of bandwidth. The cellular phone, in this example is the cheaper mode of bandwidth based strictly on functionality. The PDA provider may change its pricing to reflect transaction specific pricing to have competitive payment facilities based on bandwidth rights certificates and higher value added services to the customer.

The point of this embodiment is to emphasize the treatment of bandwidth as a commodity which may be valued in a transaction. The value inherent in information content or the facility of information itself to assist in transactional activity is valuable in an information economy. The time it takes for sender and receiver confirmation of a transaction between the user and the vending machine may take, say 5 seconds. The time spent in completing the transaction includes how much information was exchanged, in some quantitative measure such as bits, to satisfy the rules of a successful transaction. If the vending machine item is one dollar, the cost of the transaction is one dollar plus the cost of 5 seconds of air time that was used to consummate the transaction. Hence the total cost is: $1.00+5×$0.00167 (or $1.00833), if the cell phone is used; or $1.00+5×$0.00333 (or $1.01667), if the PDA is used. The cost of the goods or services sold leaves a margin of profit. There is a relationship to the efficiencies of increasing the convenience of a means of payment for users, increasing the ability of traditional bandwidth providers to leverage existing subscriptions and arrangements with customers, and the ability to atomize bandwidth as a valued commodity given its inherent nature: it is a measure of information in discrete time.

Sample Embodiment

In this embodiment we use bandwidth to purchase other information resources such as kilowatts of power from a utility power grid. As such, bandwidth acts as a currency which has a defined (though perhaps fluctuating) value. The amount of bandwidth that is used to "purchase" a specified amount of power will be determined based on the market forces at play. The total amount of bandwidth will be the cost of the goods being purchased (in this case, the specified amount of power) plus the cost of the bandwidth used to complete the transaction—which may vary with the communication channel being used (e.g., the use of a PDA vs. the use of a cell phone). In effect, "bandwidth" is removed from my account in an amount necessary to complete the transaction. To further illustrate this point, it is assumed that the amount of power being purchased is valued at $50, and it is further assumed that the transaction requires 5 seconds of air time to complete. If the purchaser has an account balance of 60,000 seconds of air time (equating to 1,000 minutes), and the fair market value of the air time is $0.00167 per second, then the purchaser's account is debited 29,945 seconds (equating to $50.00835—in other words, the $50 for the power plus the cost of the air time to complete the transaction). In some circumstances, the total cost may be increased if there is a transactional cost in addition to the cost of goods and the cost of air time. For example, if the airtime is tied to a credit card, the credit card company may charge a transactional fee (e.g., 1% or more) for all transactions executed in connection with the credit card, in which case, the credit card may debit the purchaser's account an additional 1% of air time (by way of example) which the credit card company may utilize for internal purposes or may turn around and re-sell to another user.

Other embodiments and uses of the invention will be apparent to those skilled in the art from consideration of the specification and practice of the invention disclosed herein. All references cited herein, including all U.S. and foreign patents and patent applications, are specifically and entirely hereby incorporated by reference herein. It is intended that the specification and examples be considered exemplary only, with the true scope and spirit of the invention indicated by the claims below. As will be easily understood by those of ordinary skill in the art, variations and modifications of each of the disclosed embodiments can be easily made within the scope of this invention as defined by the claims below.

What is claimed:

1. A method for network data routing, comprising:
   a processor organizing a stream of data into a plurality of packets;
   where each packet also includes a packet watermark,
   wherein the same packet watermark appears in each one of the plurality of packets;
   a sniffer determining whether, the packet watermark in a particular one of the plurality of packets also appears in a table stored in a memory;
   the sniffer determining a particular packet hash value, by performing a hash of: (1) the packet watermark in the particular one of the plurality of packets, (2) a key, and (3) at least one packet comprising the particular one of the plurality of packets;
   the sniffer determining whether the particular packet hash value is a value stored in said table;
   a router routing the particular one of the plurality of packets within the network differently, depending at least in part upon at least one of the determinations of the sniffer.

2. The method of claim 1, wherein said router deprioritizes or blocks transmission of the particular packet if the sniffer determines that the packet watermark in a particular one of the plurality of packets does not appear in the table stored in the memory.

3. The method of claim 1, wherein said router sets a quality of service (QOS) for the particular one of the plurality of packets, depending upon a value stored in the packet watermark in the particular one of the plurality of packets.

4. The method of claim 1, further comprising identifying in the particular one of the plurality of packets as part of said stream based upon data in that packet identifying at least one of Ethernet ID, port ID, URL, DNS address, and IP address.

5. The method of claim 1, further comprising generating a watermark identification (WID) as a function of a portion of said signal; said packet watermark; and a watermark key; and
   storing said WID, said packet watermark, and said watermark key in association with one another in the table stored in the memory.

6. A method for network data routing, comprising:
   forming, using memory for storing data in non-transient form, and a processor coupled to said memory, a packet watermark by using a key and a signal;
   generating a plurality of packets from a data stream and said packet watermark, wherein each one of said plurality of packets includes said packet watermark and a portion of the data contained in said data stream;
   transmitting said plurality of packets from a node of said network;
   a sniffer in said network receiving a particular one of the plurality of packets transmitted from said node;
   the sniffer determining a particular packet hash value, by performing a hash of: (1) the packet watermark in the particular one of the plurality of packets, (2) a key, and (3) at least one packet comprising the particular one of the plurality of packets;

the sniffer determining whether the particular packet hash value is a value stored in a table.

7. A method for network data routing, comprising:
a first device of the network modifying a signal so that it is represented by data in a plurality of packets;
wherein each one of said plurality of packets also contains a packet watermark;
wherein the packet watermark in each one of said plurality of packets is the same as the packet watermark in any other one of the plurality of packets;
transmitting said plurality of packets from said first device of the network;
a sniffer receiving a particular one of the plurality of packets transmitted from the first device;
the sniffer determining a particular packet hash value, by performing a hash of: (1) the packet watermark in the particular one of the plurality of packets, (2) a key, and (3) at least one packet of the plurality of packets, comprising the particular one of the plurality of packets;
the sniffer determining whether the particular packet hash value is a value stored in said table.

8. The method of claim 7, further comprising determining at least one of priority and network route for said plurality of packets, based at least upon said packet watermark.

9. A system by which a sender can guarantee a particular Quality of Service (QoS) to a receiver without entering into a cryptographic exchange with the receiver, for delivery of a data object organized into a plurality of packets each one of which includes the same packet watermark, comprising:
a router;
wherein said router comprises a receiver;
wherein said router comprises a transmitter;
wherein said router comprises a processor;
wherein said transmitter is designed to receive data packets;
wherein said transmitter is designed to transmit data packets;
wherein said router is designed to examine a data packet to determine, from the data packet, a recipient's IP address and a packet watermark;
a sniffer;
the sniffer designed to determine a particular packet hash value, by performing a hash of: (1) the packet watermark in a particular one of the plurality of packets, (2) a key, and (3) at least one packet of the plurality of packets, comprising the particular one of the plurality of packets;
the sniffer determining whether the particular packet hash value is a value stored in said table;
wherein said router is designed to determine a next-hop IP address to which to transmit said plurality of data packets, based at least in part upon the packet watermark, and the sniffer's determination.

10. The system of claim 9, wherein the router provides a QOS to the particular one of the plurality of packets based upon the packet watermark and the determination of the sniffer.

11. The system of claim 10, wherein said router is designed to compare said flow hash value with a stored value, to result in comparison;
The system of claim 9, wherein the router is designed to block flow of the particular one of the plurality of packets, if the sniffer determines that the particular packet hash value is not a value stored in said table.

12. The system of claim 9, wherein said router is designed to determine a next-hop IP address for the particular packet based at least in part upon an IP address in the particular packet.

13. The system of claim 9, wherein said router is designed to determine said next-hop IP address based at least in part upon the recipient's IP address, the packet watermark the router identifies as being present in said data packet, and a QoS value stored in said packet watermark.

14. A method of routing a signal in a network, comprising:
forming, using memory for storing data in non-transient form, and a processor coupled to said memory, a packet watermark;
forming, using the processor, a plurality of packets which contain the signal and wherein each one of the packets also contains the same packet watermark;
transmitting the plurality of packets from a node of said network;
a sniffer in the network receiving a particular one of the plurality of packets transmitted from said node;
the sniffer determining a particular packet hash value, by performing a hash of: (1) the packet watermark in the particular one of the plurality of packets, (2) a key, and (3) at least one packet comprising the particular one of the plurality of packets;
the sniffer determining whether the particular packet hash value is a value stored in a table.

15. The method of claim 14 further comprising depending routing of the particular one of the plurality of packets depending upon whether the sniffer determined the particular packet hash to be a value stored in the table.

16. The method of claim 14 further comprising rerouting, delaying routing, or halting routing, of the particular one of the plurality of packets depending a determination of the sniffer based at least in part upon the packet watermark.

17. The method of claim 14, wherein the packet watermark is stored in a field in the header of each one of the plurality of packets.

18. The method of claim 14, wherein the packet comprises a packet header, and wherein forming the packet comprises forming the packet header, and wherein the packet header of a packet containing said packet watermark stores an address and a route.

19. The method of claim 14, wherein forming the plurality of packets results in a cryptographic association between the key and the plurality of packets, as a function of the packet watermark.

20. The method of claim 14, further comprising a processor determining, using the packet watermark and a particular packet of the plurality of packets, at least one of the group consisting of: an Ethernet ID, port ID, URL, DNS address, IP address.

21. The method of claim 14, further comprising a processor determining, using the packet watermark in a packet, at least one of the group consisting of: logical context of the packets' origin and logical context of the packets' destination.

22. The method of claim 14, further comprising a processor determining, using the packet watermark in a packet, both logical context of the packets' origin and logical context of the packets' destination.

23. The method of claim 14, further comprising a processor determining, using the packet watermark in a packet, meta-data associated with the data stream.

24. The method of claim 14, further comprising a processor determining, using the packet watermark in a packet, XML data associated with the data stream.

25. The method of claim 14, further comprising a processor determining, using the packet watermark in a packet, at least one of the group consisting of: related data stream, and related packet flow.

26. The method of claim 14, further comprising a processor determining, using the packet watermark in a packet, at least one of the group consisting of: an Ethernet ID, port ID, URL, DNS address, and IP address.

* * * * *